(12) United States Patent
Endo et al.

(10) Patent No.: US 12,266,931 B2
(45) Date of Patent: Apr. 1, 2025

(54) CALCULATION APPARATUS AND CALCULATION METHOD FOR DETERMINING ENERGY STORAGE LIMITS BASED ON NET POWER PREDICTIONS

(71) Applicant: GS Yuasa International Ltd., Kyoto (JP)

(72) Inventors: Hiroaki Endo, Kyoto (JP); Masao Yokoyama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 300 days.

(21) Appl. No.: 17/755,821

(22) PCT Filed: Nov. 6, 2020

(86) PCT No.: PCT/JP2020/041446
§ 371 (c)(1),
(2) Date: May 9, 2022

(87) PCT Pub. No.: WO2021/095645
PCT Pub. Date: May 20, 2021

(65) Prior Publication Data
US 2022/0393465 A1 Dec. 8, 2022

(30) Foreign Application Priority Data

Nov. 15, 2019 (JP) .................. 2019-206995
Oct. 23, 2020 (JP) .................. 2020-177870

(51) Int. Cl.
*H02J 3/00* (2006.01)
*G06Q 50/06* (2024.01)
*H02J 3/32* (2006.01)

(52) U.S. Cl.
CPC ............. *H02J 3/003* (2020.01); *G06Q 50/06* (2013.01); *H02J 3/32* (2013.01)

(58) Field of Classification Search
CPC .. H02J 3/32; H02J 3/003; H02J 7/0048; H02J 3/004; H02J 7/005; G06Q 10/04;
(Continued)

(56) References Cited

U.S. PATENT DOCUMENTS 8,966,384 B2 * 2/2015 Rye .................... G05B 23/0216
715/764
10,230,241 B1 * 3/2019 Rule ..................... G05B 15/02
(Continued)

FOREIGN PATENT DOCUMENTS

JP 2009-284586 A 12/2009
JP 4765162 9/2011
(Continued)

OTHER PUBLICATIONS

International Search Report and Written Opinion for International Application No. PCT/JP2020/041446, dated Dec. 22, 2020, (8 pages), Japan Patent Office, Tokyo, Japan.

*Primary Examiner* — Darrin D Dunn
(74) *Attorney, Agent, or Firm* — Alston & Bird LLP

(57) ABSTRACT

A calculation device 20 is linked with an electric power system 1 and optimizes energy utilization efficiency of a grid S1 including a power storage device 15. The calculation device 20 determines the range of a final charge state of a prediction target section of the power storage device 15 on the basis of power demand prediction for the next and following sections, and assesses, through the optimization calculation for the prediction target section, whether or not the final charge state of the section falls within the range.

20 Claims, 13 Drawing Sheets

(58) Field of Classification Search
CPC .... G06Q 10/063; G06Q 10/06; G05B 13/048; G05B 15/02; G05B 13/026; G05B 13/0265
See application file for complete search history.

(56) References Cited

U.S. PATENT DOCUMENTS

| | | |
|---|---|---|
| 2004/0225648 A1* | 11/2004 | Ransom ................ G06Q 10/10 |
| 2017/0317528 A1* | 11/2017 | Fife ......................... H02J 3/003 |
| 2018/0054070 A1* | 2/2018 | Krishnamoorthy ... H02J 7/0014 |
| 2018/0233914 A1 | 8/2018 | Miki et al. |
| 2019/0020197 A1* | 1/2019 | Ahn ......................... H02J 7/35 |
| 2021/0013734 A1 | 1/2021 | Shirasaki |
| 2021/0184466 A1* | 6/2021 | Rod ........................ H02J 3/003 |

FOREIGN PATENT DOCUMENTS

| | | |
|---|---|---|
| JP | 2015-201950 A | 11/2015 |
| JP | 2016-039648 A | 3/2016 |
| JP | 2017-028864 A | 1/2017 |
| JP | 2017-038432 A | 2/2017 |
| JP | 2017-051094 A | 3/2017 |
| JP | 2018-157749 A | 10/2018 |
| JP | 2018-182896 A | 11/2018 |
| JP | 2018-185609 A | 11/2018 |
| JP | 2019-047598 A | 3/2019 |
| JP | 6671575 B1 | 3/2020 |
| WO | WO-2017/104161 A1 | 6/2017 |
| WO | WO-2018/003947 A1 | 1/2018 |

\* cited by examiner

CALCULATION APPARATUS AND CALCULATION METHOD FOR DETERMINING ENERGY STORAGE LIMITS BASED ON NET POWER PREDICTIONS

CROSS REFERENCE TO RELATED APPLICATIONS

This application is a national stage application, filed under 35 U.S.C. § 371, of International Application No. PCT/JP2020/041446, filed Nov. 6, 2020, which international application claims priority to and the benefit of Japanese Application Nos. 2019-206995, filed Nov. 15, 2019, and 2020-177870, filed Oct. 23, 2020; the contents of all of which as are hereby incorporated by reference in their entireties.

BACKGROUND

Technical Field

The present invention relates to a technique for optimizing energy use efficiency of a grid.

Description of Related Art

Introduction of a distributed power supply typified by a photovoltaic (PV) power generation system has been promoted from the viewpoint of reduction of dependence on a fossil fuel and an environmental problem. A PV system converts power generated by a solar power generation panel from a direct current (DC) to an alternating current (AC) using an inverter circuit of a power control device, and outputs the AC.

Japanese Patent No. 4765162 discloses a technique for controlling second power conversion means such that received power detected by received power detection means does not fall below predetermined power during output of both the generated power of the distributed power supply and the power from power storage means in the power storage type solar power generation system. Thus, the power from the power storage means is prevented from flowing back to a power system.

BRIEF SUMMARY

When an energy storage apparatus has sufficient reserve power, the grid including the energy storage apparatus can absorb excess or deficiency of the power by charge-discharge to compensate for the excess or deficiency. The reserve power is, when a surplus of power is charged and stored, a remaining capacity that can be charged. When a shortage of power is compensated for by the discharge, the reserve power is a capacity that can be discharged.

In the case of performing a calculation for optimizing the energy use efficiency of the grid, when the state of charge of the energy storage apparatus is determined only by the supply and demand prediction of the power in the section, sometimes the energy storage apparatus cannot secure the reserve power, which should absorb the excess or deficiency of the power caused in the next section or later, at the start of the next section.

In a calculation apparatus for optimizing energy use efficiency of a grid that is interconnected to a power system and includes an energy storage apparatus, a range of a final charge state in a prediction target section of the energy storage apparatus is determined based on a supply and demand prediction of power in a next section or later, and whether the final charge state of the section is matched with the range is evaluated by the optimization calculation of the prediction target section.

The above aspect can be applied to a calculation method for optimizing the energy use efficiency of the grid interconnected to the power system and including the energy storage apparatus. The present invention can be applied to a program performing the optimization calculation.

At the start of the next section, it is possible to secure the reserve power, which should absorb the excess or deficiency of the power caused in the next section or later, for the energy storage apparatus.

DETAILED DESCRIPTION OF VARIOUS EMBODIMENTS

Figure 1:
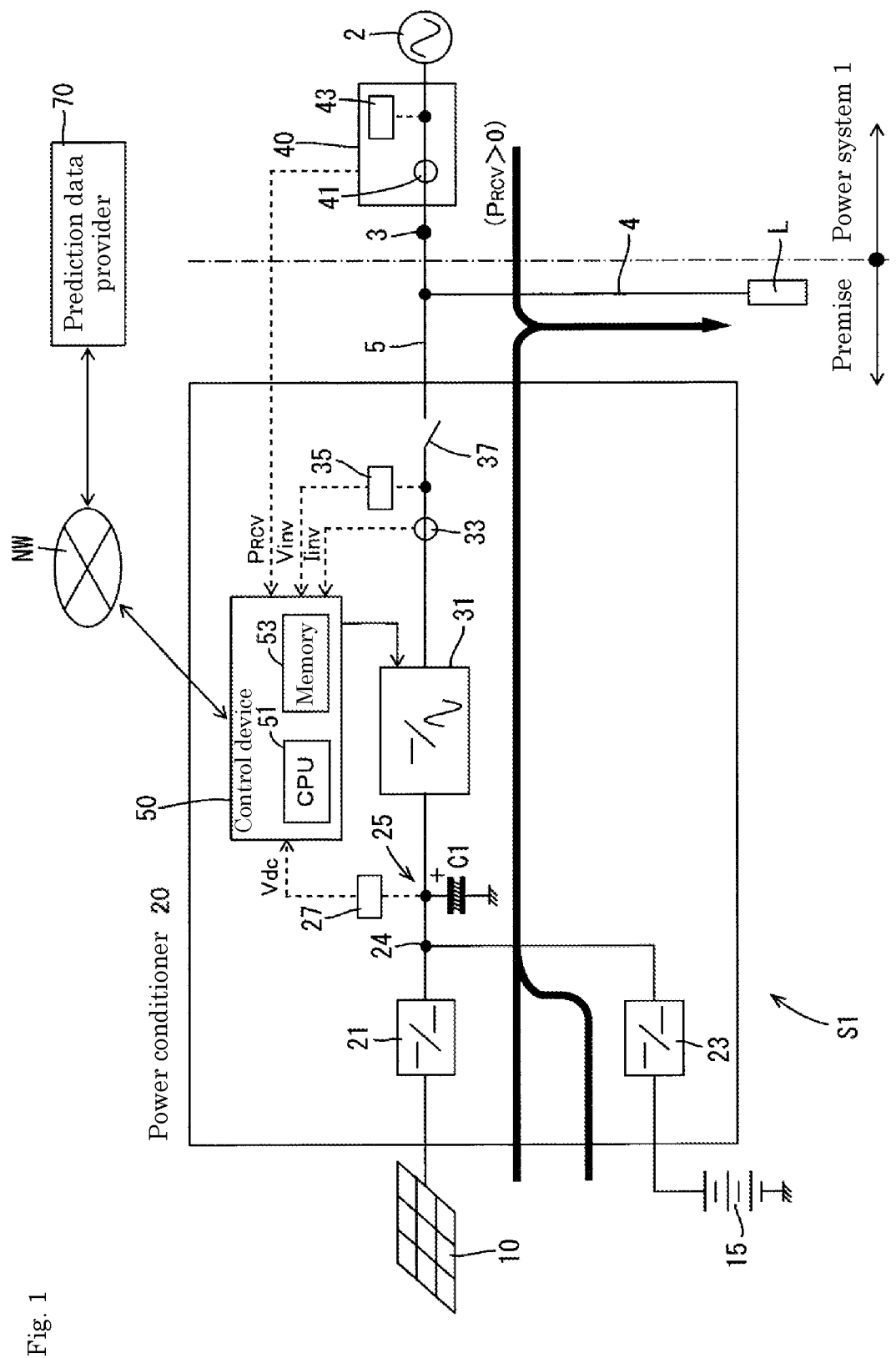
FIG. 1 is a block diagram of a microgrid.

In a calculation apparatus for optimizing energy use efficiency of a grid that is interconnected to a power system and includes an energy storage apparatus, a range of a final charge state in a prediction target section of the energy storage apparatus is determined based on a supply and demand prediction of power in a next section or later, and whether the final charge state of the section is matched with the range is evaluated by the optimization calculation of the prediction target section.

In this configuration, the range of the final charge state in the section is determined based on the supply and demand prediction of the power after the next section. Because the final charge state of the section is the starting charge state of the next section, the final charge state of the section is matched with the determined range, so that the reserve power, which should absorb the excess or deficiency of the power caused in the next section or later, can be secured for the energy storage apparatus at the start of the next section.

A surplus power amount in a first period, in which supply of the power exceeds demand, in the next section or later may be calculated based on the supply and demand prediction of the power in the next section or later, and an upper limit value of the final charge state in the section may be determined to be a value obtained by subtracting a numerical value corresponding to the surplus power amount from a use range upper limit of the energy storage apparatus. In this configuration, at the starting time point of the next section, the reserve power (free capacity) for charging the surplus power of the grid can be secured in the energy storage apparatus. Thus, energy loss can be prevented.

A minimum surplus power amount in the first period may be calculated based on the supply and demand prediction of the power in the next section or later, and the upper limit value of the final charge state in the section may be determined to be a value obtained by subtracting a numerical value corresponding to the minimum surplus power amount from the use range upper limit of the energy storage apparatus. In this configuration, at the starting time point of the next section, the reserve power (free capacity) for charging at least the minimum surplus power amount can be secured in the energy storage apparatus.

A deficient power amount, by which power supply falls below the demand to cause power shortage, may be calculated for a second period from a start of the next section to the first period, and a lower limit value of the final charge state in the section may be determined to be a value obtained by adding a numerical value corresponding to the deficient power amount to a use range lower limit of the energy storage apparatus. In this configuration, at the starting time point of the next section, the reserve power for discharging the shortage power of the grid can be secured in the energy storage apparatus. Therefore, the energy can be efficiently used.

A maximum deficient power amount in the second period may be calculated based on the supply and demand prediction of the power in the next section or later, and the lower limit value of the final charge state in the section may be determined to be a value obtained by adding a numerical value corresponding to the maximum deficient power amount to the use range lower limit of the energy storage apparatus. In this configuration, at the starting time point of the next section, the reserve power for discharging the maximum deficient power amount can be secured in the energy storage apparatus.

First Embodiment

1. Description of Microgrid S1

A microgrid S is a small-scale power system interconnected to a power system 1, and includes at least a distributed power supply, an energy storage apparatus, and a load. The power system 1 may be a power system of a power provider or an independent power system constructed by a self-sustained operation output of a large power conditioner.

FIG. 1 is a block diagram of the microgrid S1. The microgrid S1 includes a solar power generation panel 10 that is the distributed power supply, a storage battery 15 that is the energy storage apparatus, a power conditioner 20 that is the power control device, and a load L.

The power conditioner 20 includes a first converter circuit 21, a second converter circuit 23, a DC link unit 25, a bidirectional inverter circuit 31, a relay 37, a control device 50, a DC voltage detection unit 27, an output current detection unit 33, and an output voltage detection unit 35.

The solar power generation panel 10 is connected to the first converter circuit 21. The first converter circuit 21 is a DC/DC converter, and boosts and outputs an output voltage (DC) of the solar power generation panel 10. The first converter circuit 21 may be a chopper.

The storage battery 15 is connected to the second converter circuit 23. For example, the storage battery 15 is a secondary battery. The second converter circuit 23 is a bidirectional DC/DC converter that discharges and charges the storage battery 15. The second converter circuit 23 may be a bidirectional chopper.

The solar power generation panel 10 and the storage battery 15 are connected in parallel to the DC link unit 25 through the first converter circuit 21 and the second converter circuit 23.

The DC link unit 25 is located between a connection point 24 of the converter circuits and the bidirectional inverter circuit 31. An electrolytic capacitor C1 is provided in the DC link unit 25. The electrolytic capacitor C1 is provided so as to stabilize voltage Vdc of the DC link unit 25.

The DC voltage detection unit 27 detects the voltage Vdc of the DC link unit 25. The voltage Vdc of the DC link unit 25 detected by the DC voltage detection unit 27 is input to the control device 50.

The bidirectional inverter circuit 31 is a bidirectional conversion circuit that selectively performs an inverse conversion (inverter) converting the DC into the AC and a forward conversion (converter) converting the AC into the DC. The bidirectional inverter circuit 31 is connected to the DC link unit 25, and converts DC power input from the DC link unit 25 into AC power and outputs the AC power during reverse conversion operation. Particularly, power corresponding to voltage increased from a reference value in the DC link unit 25 by power generation of the solar power generation panel 10 is input to the bidirectional inverter circuit 31. Consequently, the power corresponding to the voltage increased from the reference value is converted from the DC to the AC and output from the bidirectional inverter circuit 31.

The storage battery 15 can store surplus power of the solar power generation panel 10 through the second converter circuit 23. When the generated power of the solar power generation panel 10 is insufficient, the storage battery 15 can compensate for the shortage of the generated power by the discharge through the second converter circuit 23.

The bidirectional inverter circuit 31 is connected to the power system 1 using the system power supply 2 as an AC power supply through a relay 37.

The relay 37 is installed for interconnection with the power system 1. The microgrid S1 can be interconnected to the power system 1 by closing the relay 37.

The output current detection unit 33 detects output current Iinv of the bidirectional inverter circuit 31. The output voltage detection unit 35 is located on an output side of the bidirectional inverter circuit 31, and detects output voltage Vinv of the bidirectional inverter circuit 31.

The output current Iinv of the bidirectional inverter circuit 31 detected by the output current detection unit 33 and the output voltage Vinv of the bidirectional inverter circuit 31 detected by the output voltage detection unit 35 are input to the control device 50. The control device 50 calculates output power (active power) Pinv of the bidirectional inverter circuit 31 based on the output current Iinv and the output voltage Vinv of the bidirectional inverter circuit 31. The output power Pinv is "positive" during the reverse conversion and "negative" during the forward conversion.

The load L that is a demand facility is connected to a power line (trunk line) 5 connecting the bidirectional inverter circuit 31 and the power system 1 through a branch line 4. The power can be supplied to the load L from both the power conditioner 20 and the power system 1.

A power receiving point 3 is a power supply point by the power system 1, and is a boundary portion between the power system 1 and premises (microgrid S1) as illustrated in FIG. 1.

An external measuring instrument 40 such as an external transducer is provided in the power system 1 as an instrument detecting the power at the power receiving point 3.

The external measuring instrument 40 includes a received current detection unit 41 and a system voltage detection unit 43. The external measuring instrument 40 is installed corresponding to the power receiving point 3, and the received current detection unit 41 detects a received current at the power receiving point 3. The system voltage detection unit 43 detects the system voltage of the power system 1.

The external measuring instrument 40 calculates the received power (effective power) $P_{RCV}$ based on the received current and the system voltage. The received power $P_{RCV}$ detected by the external measuring instrument 40 is input to the control device 50. The received power $P_{RCV}$ can be used to determine the state of a power flow (hereinafter, simply referred to as a flow). The external measuring instrument 40 is a measuring instrument that measures the received power $P_{RCV}$ of the power receiving point 3.

Figure 2:
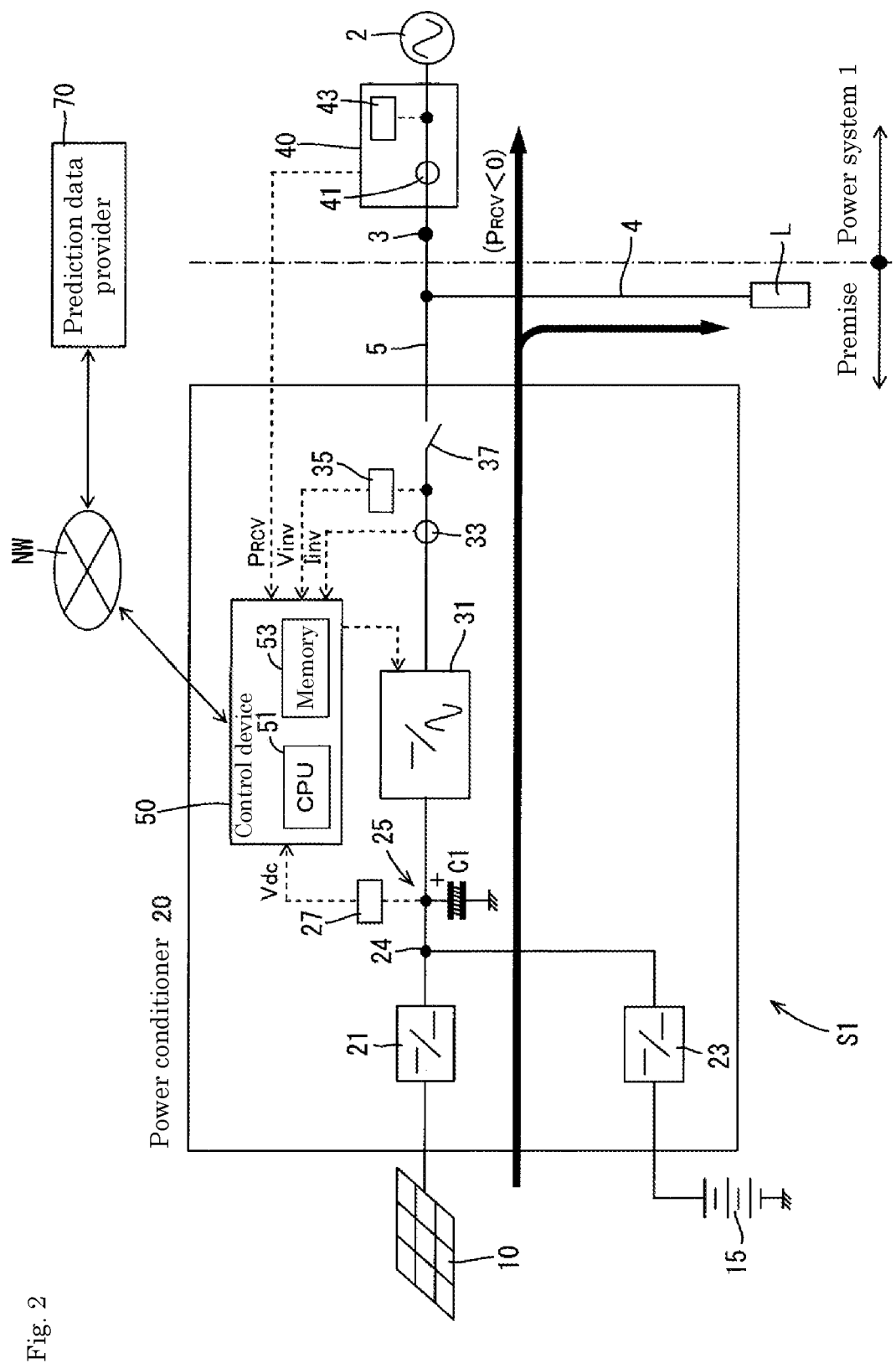
FIG. 2 is a block diagram of the microgrid.

In the received power $P_{RCV}$, a forward flow (FIG. 1: the flow of electricity from the power system 1 to the microgrid S1) is set to "positive", and a reverse flow (FIG. 2: the flow of electricity from the microgrid S1 to the power system 1) is set to "negative".

The control device 50 includes a CPU 51 and a memory 53. The memory 53 stores a program predicting supply and demand of the power of the microgrid S1 and a program performing the optimization calculation optimizing the energy use efficiency of the microgrid S1. The control device 50 is an example of the "calculation apparatus" of the present invention.

The control device 50 can give a command to the bidirectional inverter circuit 31 to control switching between the forward conversion operation and the reverse conversion operation. The output of the bidirectional inverter circuit 31, namely, the output power Pinv can be controlled. The output power Pinv can be controlled by adjusting the output current Iinv.

The control device 50 turns on and off the first converter circuit 21 to control connection and non-connection of the solar power generation panel 10 to and from the DC link unit 25. The connection and disconnection of the storage battery 15 with respect to the DC link unit 25 can be controlled by turning on and off the second converter circuit 23. The control device 50 can control switching between charge and discharge of the storage battery 15 through the second converter circuit 23. The charge current and the discharge current of the storage battery 15 can be controlled through the second converter circuit 23.

2. Power Generation Prediction and Load Prediction of Microgrid S1

The control device 50 predicts the generated power [kW] of the solar power generation panel 10 and the power consumption [kW] of the load L.

Figure 3:
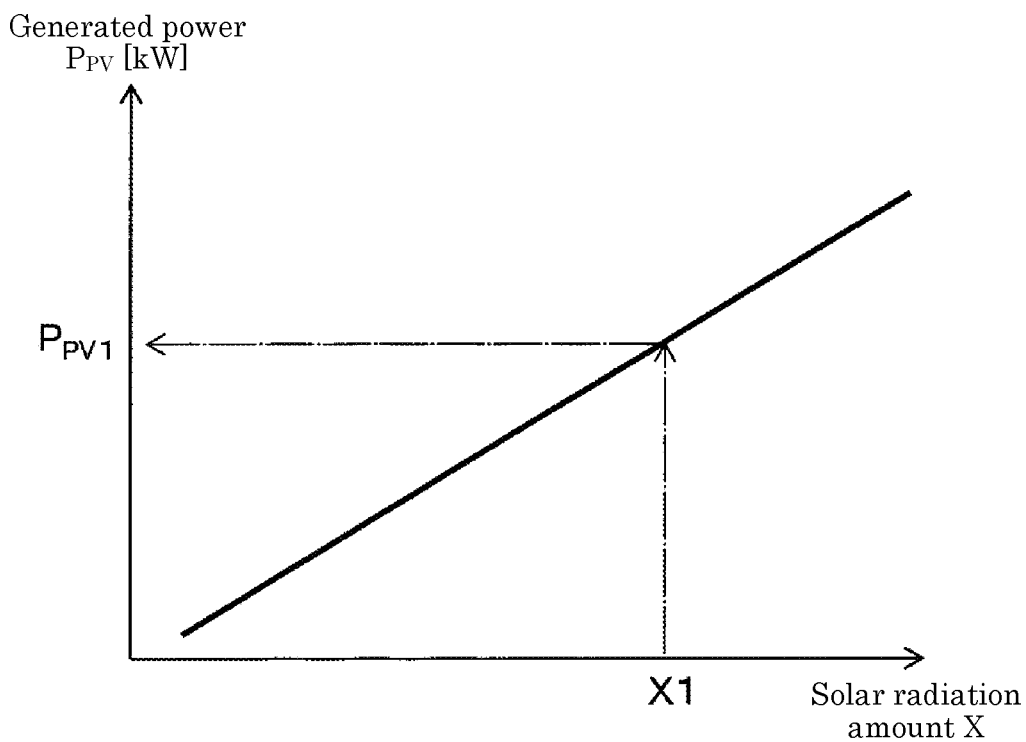
FIG. 3 is a graph illustrating a correlation characteristic between a solar radiation amount and generated power.

Generated power $P_{PV}$ of the solar power generation panel 10 has a correlation with a solar radiation amount X as illustrated in FIG. 3. The prediction value of the generated power $P_{PV}$ can be obtained from a prediction data provider 70 through a network NW. The prediction data provider 70 may be a provider by a provider of the power conditioner 20 or a provider of a power generation company. The generated power $P_{PV}$ of the solar power generation panel 10 is converted into the AC by the bidirectional inverter circuit 31.

Conversion efficiency η is conversion efficiency of the inverter circuit 31 when the DC is converted into the AC.

The power consumption $P_{LOAD}$ of the load L can be predicted from past data. For example, the power consumption of the next day can be predicted by statistically processing the data of the power consumption $P_{LOAD}$ for several days.

The power consumption $P_{LOAD}$ of the load L can be obtained from the received power $P_{RCV}$ of the power receiving point 3 and the output power Pinv of the bidirectional inverter circuit 31. In the case of the forward current ($P_{RCV}>0$), the power consumption $P_{LOAD}$ of the load L is a sum of the output power Pinv and the received power $P_{RCV}$. In the case of the reverse power flow ($P_{RCV}<0$), the power consumption $P_{LOAD}$ of the load L is a difference between the output power Pinv and the received power $P_{RCV}$.

$$P_{LOAD} = \text{Pinv} + P_{RCV} \quad (A)$$

Figure 4:
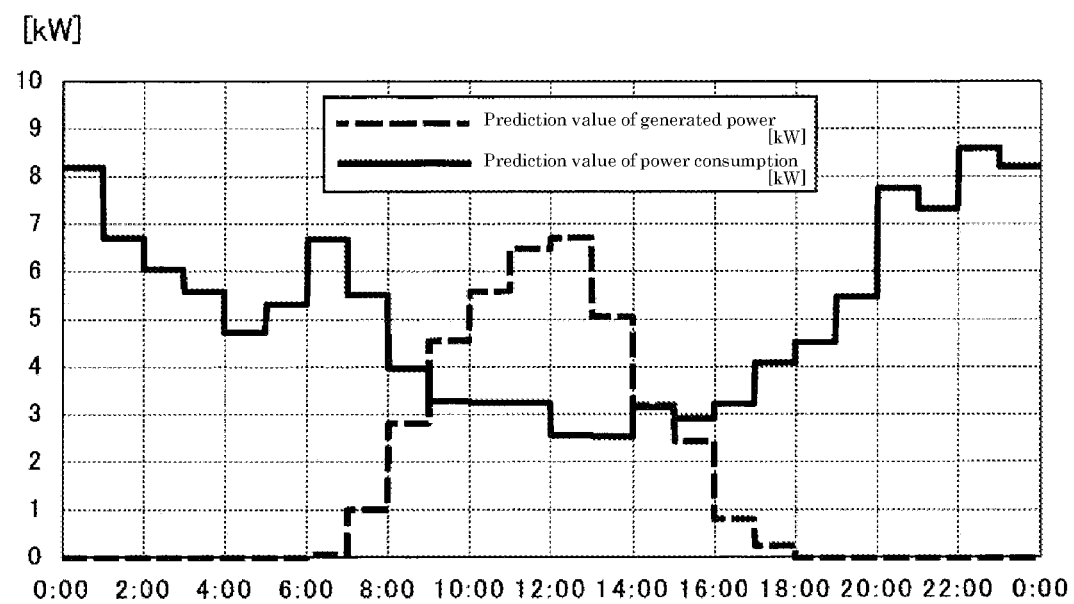
FIG. 4 is a graph illustrating transitions of a prediction value of generated power and a prediction value of power consumption.

FIG. 4 is a graph illustrating results of power generation prediction and load prediction of the microgrid S1. A broken line is the prediction value of the generated power of the microgrid S1, and a solid line is the prediction value of the power consumption of the microgrid S1. In this example, the power generation prediction and the load prediction are performed every hour while setting a prediction target period T as one day, and the prediction value is a stepwise waveform in which the value changes every hour. The power generation prediction and the load prediction of the microgrid S1 may be performed by the control device 50, or the data predicted by another device may be obtained.

3. Optimization Calculation Optimizing Microgrid Energy Efficiency

Figure 5:
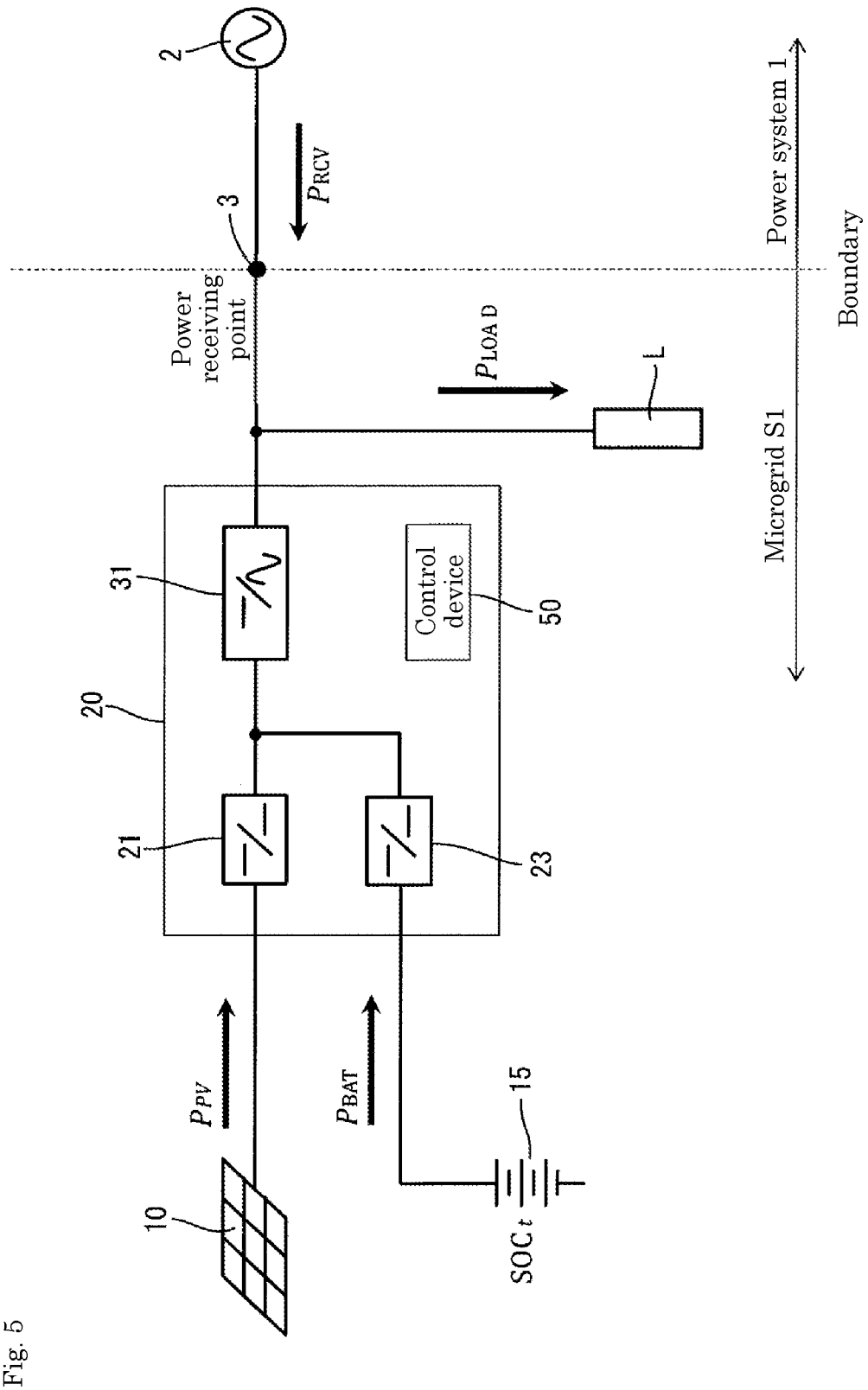
FIG. 5 is a simplified block diagram of the microgrid.

FIG. 5 is a simplified block diagram of the microgrid S1.

The control device 50 performs the optimization calculation that optimizes the energy use efficiency of the microgrid S1. The optimization calculation is to obtain an optimum value of a target value (hereinafter, a received power target value $P_{RCVref}$) of the received power $P_{RCV}$ that minimizes an objective function F of Mathematical formula 1 based on the power generation prediction and the load prediction (FIG. 4).

An equation 1 is an objective function evaluating the energy use efficiency of the microgrid S1.

$$F = \sum_{t \in T} \{k_1 \cdot T_{MAX}(P_{RCVreft}, P_{PVt}, P_{LOADt}) + \\ k_2 \cdot T_{MIN}(P_{RCVreft}, P_{PVt}, P_{LOADt}) + \\ k_3 \cdot P_{RCV}(P_{RCVreft}, P_{PVt}, P_{LOADt})\} + k_4 \cdot P_{PEAK}$$

[Mathematical formula 1]

A first term and a second term of the objective function F are terms evaluating the use-restricted period of the storage battery 15. A third term and a fourth term are terms evaluating the electricity rate of the microgrid S1.

The use-restricted period includes two periods including a charge-restricted period $T_{MAX}$ and a discharge-restricted period $T_{MIN}$. The charge-restricted period $T_{MAX}$ is a period during which the charge is restricted, and for example, is the case where a SOC of the storage battery 15 is located at the upper limit of the use range (in the case of full charge). The discharge-restricted period $T_{MIN}$ is a period during which the discharge is restricted, and for example, is the case where the SOC of the storage battery 15 is located at a lower limit of the use range.

In this example, $k_1 > k_2 > k_3 > k_4$ is satisfied, and the evaluation of the use-restricted period of the storage battery 15 is prioritized in the evaluation of the energy use efficiency of the microgrid S1. $k_1=k_2$ and $k_3=k_4$ may be satisfied.

When the arithmetic calculation optimizing a received power target value $P_{RCVref}$ is performed, there are two conditions of an upper limit and a lower limit (an equation 2) of the received power target value $P_{RCVref}$ and an upper limit and a lower limit (an equation 3) of the output power [kW] of the storage battery 15 as constraint conditions.

(Upper and Lower Limit Constraint on Received Power Target Value)

$$-P_{PCSCAP} \leq P_{RCVref\ t} \leq P_{PCSCAP}\ (t \in T) \qquad \text{[Mathematical formula 2]}$$

(Upper and Lower Limit Constraint on Output Power of Storage Battery)

$$-P_{BATCAP} \leq (P_{LOAD\ t} - P_{RCVref\ t} - P_{PV\ t} \cdot \eta) P_{BATCAP}\ (t \in T) \qquad \text{[Mathematical formula 3]}$$

TABLE 1

| | |
|---|---|
| T | Set of total time section t (prediction target period) |
| $T_{MAX}(P_{RCVref\ t}, P_{PV\ t}, P_{LOAD\ t})$ | Charge-restricted period in time section t |
| $T_{MIN}(P_{RCVref\ t}, P_{PV\ t}, P_{LOAD\ t})$ | Discharge-restricted period in time section t |
| $P_{RCV}(P_{RCVref\ t}, P_{PV\ t}, P_{LOAD\ t})$ | Received power estimated value in time section t [kW] |
| $P_{PEAK}$ | Received power peak value of prediction target period T [kW] |
| $k_1 \sim k_4$ | Weighting factor |
| $P_{RCVref\ t}$ | Received power target value in time section t [kW] |
| $P_{PV\ t}$ | Generation power prediction value of PV panel in time section t [kW] |
| $P_{LOAD\ t}$ | Power consumption prediction value of load in time section t [kW] |
| $P_{PCSCAP}$ | Power conditioner rated capacity [kW] |
| $\eta$ | Conversion efficiency [%] |
| $P_{BATCAP}$ | Storage battery rated charge-discharge power [kW] |

The SOC (state of charge) is a ratio of a charge amount to rated capacity of the storage battery 15. The SOC is an example of the "charge state" of the storage battery 15. In order to calculate the objective function F, the SOC of the storage battery 15 is required to be estimated. A method of simulating the SOC of the storage battery 15 and the estimated value of received power $P_{RCVt}$ will be described below.

A method for calculating the charge-restricted period $T_{MAX}$ and discharge-restricted period $T_{MIN}$ in a time section t will be described.

<Step 1>

A provisional output power prediction value $P_{BATtmpt}$ of the storage battery 15 at the time section t is calculated from an equation 4 and an equation 5.

$$0 \leq (P_{LODt} - P_{RCVreft} - P_{PVt} \cdot \eta) \leq P_{BATCAP} \quad \text{[Mathematical formula 4]}$$
$$P_{BATtmpt} = \frac{(P_{LODt} - P_{RCVreft})}{\eta} - P_{PVt}$$

(during discharge)

$$-P_{BATCAP} \leq (P_{LODt} - P_{RCVreft} - P_{PVt} \cdot \eta) < 0 \quad \text{[Mathematical formula 5]}$$
$$P_{BATtmpt} = (P_{LODt} - P_{RCVreft}) \cdot \eta - P_{PVt}$$

(during charge)

<Step 2>

From an equation 6 to an equation 9, a provisional state-of-charge prediction value $SOC_{tmpt}$ of the storage battery 15 in the time section t is calculated.

(a) In the case of t=0

$$Wh_{BAT\ 0} = SOC_{INI} \times BATCAP \qquad \text{[Mathematical formula 6]}$$

$$Wh_{BATtmp\ t} = Wh_{BAT\ 0} - P_{BATtmp\ t} \times \text{hour} \qquad \text{[Mathematical formula 7]}$$

(b) In the case of t≠0

$$Wh_{BATtmp\ t} = Wh_{BAT\ t-1} - P_{BATtmp\ t} \times \text{hour} \qquad \text{[Mathematical formula 8]}$$

$$SOC_{tmpt} = \frac{Wh_{BATtmpt}}{BATCAP} \times 100 \qquad \text{[Mathematical formula 9]}$$

<Step 3>

The presence or absence of deviation from the upper and lower limits the presence or absence of the matching of the upper and lower limits in the time section t is determined, and the state-of-charge prediction value $SOC_t$ of the storage battery 15, the output power $P_{BATt}$ of the storage battery 15, the charge-restricted period $T_{MAX}$, and the discharge-restricted period $T_{MIN}$ are determined.

(a) In the case of $SOC_{tmpt} \geq SOCMAX$ $$T_{MAX}(P_{RCVref\ t}, P_{PV\ t}, P_{LOAD\ t})=1, T_{MIN}(P_{RCVref\ t}, P_{PV\ t}, P_{LOAD\ t})=0 \qquad \text{[Mathematical formula 10]}$$

$$P_{BAT\ t}=(SOC_{tmp\ t-1}-SOCMAX) \times BATCAP \qquad \text{[Mathematical formula 11]}$$

(b) In the case of $SOC_{tmpt} \leq SOCMIN$ $$T_{MAX}(P_{RCVref\ t}, P_{PV\ t}, P_{LOAD\ t})=0, T_{MIN}(P_{RCVref\ t}, P_{PV\ t}, P_{LOAD\ t})=1 \qquad \text{[Mathematical formula 12]}$$

$$P_{BAT\ t}=(SOC_{tmnp\ t-1}-SOCMIN) \times BATCAP \qquad \text{[Mathematical formula 13]}$$

(c) In the case of $SOCMIN < SOC_{tmpt} < SOCMAX$ $$T_{MAX}(P_{RCVref\ t}, P_{PV\ t}, P_{LOAD\ t})=0, T_{MIN}(P_{RCVref\ t}, P_{LOAD\ t})=0 \qquad \text{[Mathematical formula 14]}$$

$$P_{BAT\ t}=P_{BATtmp\ t} \qquad \text{[Mathematical formula 15]}$$

Subsequently, an initial value (in the case of t=0) of the charge amount prediction value $Wh_{BATt}$ of the storage battery 15 can be obtained from equations 16, 17.

$$Wh_{BAT\ 0}=SOC_{INI} \times BATCAP \qquad \text{[Mathematical formula 16]}$$

$$Wh_{BAT\ t}=Wh_{BAT\ 0}-P_{BAT\ t} \times \text{hour} \qquad \text{[Mathematical formula 17]}$$

Subsequently, the charge amount prediction value $Wh_{BATt}$ of the storage battery 15 can be obtained for each time section (when t≠0) by an equation 18. The prediction value $SOC_t$ of the SOC of the storage battery 15 can be obtained from an equation 19.

$$Wh_{BAT\ t}=Wh_{BAT\ t-1}-P_{BAT\ t} \times \text{hour} \qquad \text{[Mathematical formula 18]}$$

[Mathematical formula 19]

$$SOC_t = \frac{Wh_{BATt}}{BATCAP} \times 100$$

The received power prediction value $P_{RCV}$ at the time section t can be calculated from equations 20, 21.

$$(P_{PVt}+P_{BATt}) \geq 0 \ldots \text{(during power conditioner inverse conversion)} \; P_{RCV}(P_{RCVref\,t},$$
$$P_{PVt}, P_{LOADt}) = P_{LOADt} - (P_{PVt}+P_{BATt}) \quad \text{[Mathematical formula 20]}$$

$$(P_{PVt}+P_{BATt}) < 0 \ldots \text{(during power conditioner conversion)} \quad \text{[Mathematical formula 21]}$$

$$P_{RCV}(P_{RCVref\,t}, P_{PVt}, P_{LOADt}) =$$
$$P_{LOADt} - \frac{(P_{PVt}+P_{BATt})}{\eta}$$

A receiving power peak prediction value $P_{PEAK}$ in the prediction target period T can be calculated from an equation 22.

$$P_{PEAK}=P_{RCV}(P_{RCVref\,t}, P_{PVt}, P_{LOAD\,t})$$

if $P_{PEAK\_old} \leq P_{RCV}(P_{RCVref\,t}, P_{PVt}, P_{LOADt})$ [Mathematical formula 22]

(here, at t=0, $P_{PEAK\_old}=P_{PEAK\_INI}$)

TABLE 2

| | |
|---|---|
| $P_{BATtmp\,t}$ | Provisional output power prediction value of storage battery in time section t [kW] |
| $Wh_{BAT\,t-1}$ | Storage battery charge amount in previous time section t_1 [kWh] |
| $Wh_{BATtmp\,t}$ | Provisional charge amount prediction value of storage battery in time section t [kWh] |
| $SOC_{INI}$ | Storage battery charge state initial value in prediction target period T [%] |
| BATCAP | Storage battery rated capacity [kWh] |
| hour | Pitch width [h] |
| $SOC_{tmp\,t}$ | Provisional charge state prediction value of storage battery in time section t [%] |
| SOCMAX | Storage battery charge state upper limit [%] |
| SOCMIN | Storage battery charge state lower limit [%] |
| $P_{BAT\,t}$ | Storage battery output power prediction value in time section t [kw] |
| $Wh_{BAT\,t}$ | Storage battery charge amount prediction value in time section t [kwh] |
| $SOC_t$ | Storage battery charge state prediction value in time section t [%] |
| $P_{PEAK\_old}$ | Peak power until previous time section t − 1 in prediction target period T [kw] |
| $P_{PEAK\,INI}$ | Peak power initial value in prediction target period T [kw] |

From equations 4 to 19, when the received power target value $P_{RCVreft}$ is determined with respect to a generated power prediction value $P_{PVt} \times \eta$ and a power consumption prediction value $P_{LOADt}$ of the load L, a $SOC_t$ of the storage battery 15 can be estimated.

In each time section t, the control device 50 estimates the $SOC_t$ of the storage battery 15 using the received power target value $P_{RCVreft}$ as a variable, and calculates four terms of the objective function F from the result.

Such an operation is performed (twenty-four cycles are executed when the prediction target period T is one day and when the arithmetic cycle is one hour) in the prediction target period T. Then, when the values of the objective function F are compared to each other with respect to the pattern of the combination of the received power target values $P_{RCVreft}$, the combination of the received power target values minimizing the objective function F, namely, the received power target value $P_{RCVreft}$ of each time section t can be determined for the prediction target period T.

Figure 6:
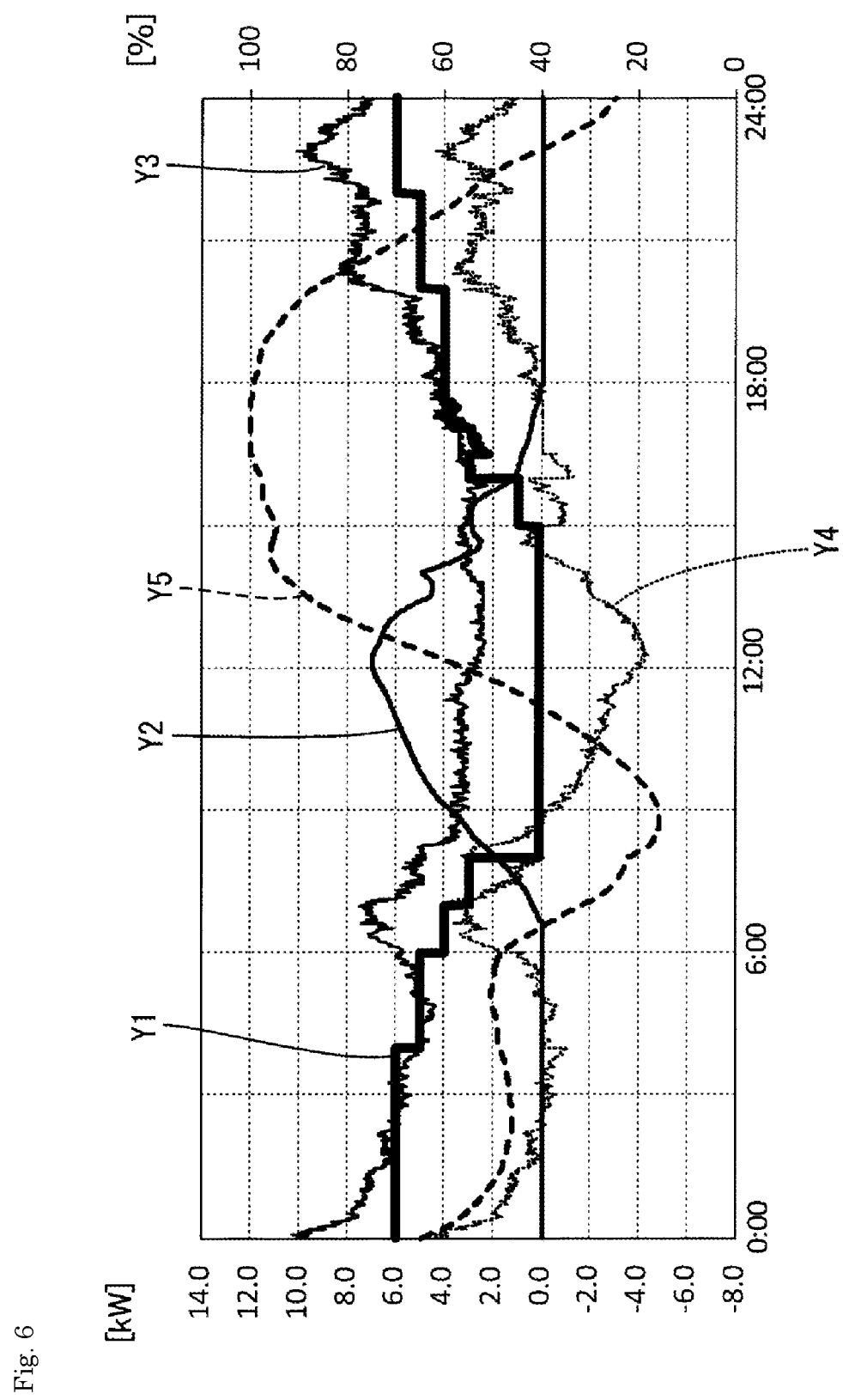
FIG. 6 is a graph illustrating a transition of a state of charge of a storage battery.
Figure 7:
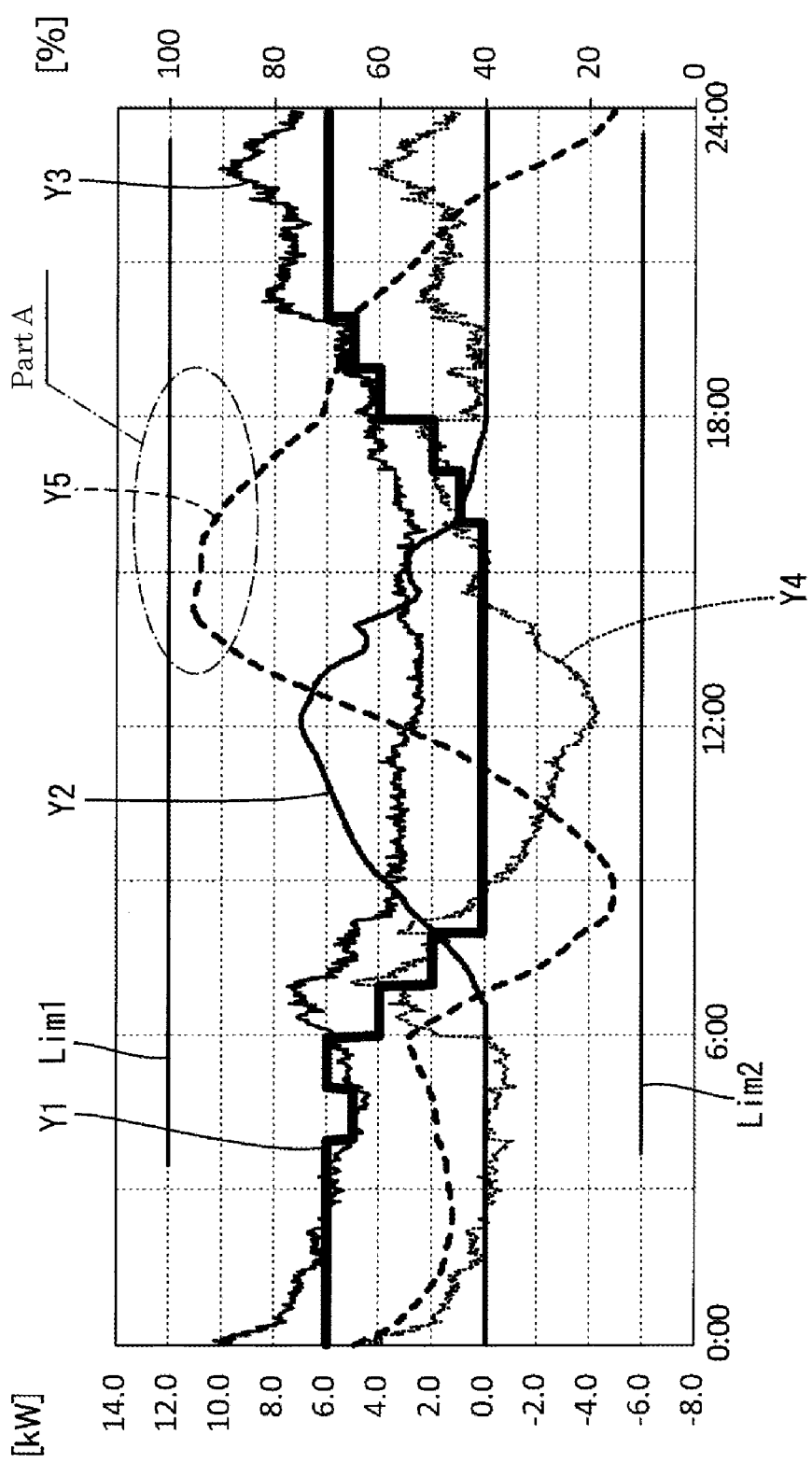
FIG. 7 is a graph illustrating the transition of the state of charge of the storage battery.

FIGS. 6 and 7 are graphs in which a horizontal axis represents time [h], a left vertical axis represents power [kW], and a right vertical axis represents the SOC [%]. Y1 (bold line) indicates a transition of the received power [kW], and Y2 indicates a transition of the generated power [kW]. Y3 represents a transition of the power consumption [kW] of the load, Y4 represents a transition of the output power [kW] of the storage battery, and Y5 (broken line) represents a transition of the SOC [%] of the storage battery 15.

FIG. 6 illustrates the case where the received power target value $P_{RCVref}$ is determined by an empirical rule, and FIG. 7 illustrates the case where the received power target value $P_{RCVref}$ is determined based on the objective function F.

When the received power target value $P_{RCVref}$ is determined by the empirical rule (FIG. 6), the SOC of the storage battery 15 is maintained around 100 [%] in the time zone of 16:00 to 18:00. For this reason, the storage battery 15 is required to restrict acceptance of the charge in the time zone of 16:00 to 18:00.

When the received power target value $P_{RCVref}$ is determined based on the objective function F (FIG. 7), the SOC of the storage battery 15 changes with a margin with respect to an SOC upper limit line Lim 1 (SOCMAX=100 [%]) and an SOC lower limit line Lim 2 (SOCMIN=10 [%]), and both the charge and the discharge are always possible. That is, when the received power target value $P_{RCVref}$ is compared with the case of the empirical rule, the SOC is suppressed to be low in the time zone (part A) of 16:00 to 18:00, and the point that the charge in this time zone is not limited is improved.

4. Power Control of Microgrid

The control device 50 controls the power of the microgrid S1 such that the received power $P_{RCV}$ of the microgrid S1 follows the received power target value $P_{RCVref}$ calculated using the objective function F.

For example, when a measurement value of the received power $P_{RCV}$ is lower than the received power target value $P_{RCVref}$ during the forward flow in the power receiving point 3 and the reverse conversion operation in the inverter circuit 31, the output power of the storage battery 15 is narrowed to reduce the difference between the measurement value of the received power $P_{RCV}$ and the received power target value $P_{RCVref}$. When the measurement value of the received power $P_{RCV}$ is higher than the received power target value $P_{RCVref}$, the difference between the measurement value of the received power $P_{RCV}$ and the received power target value $P_{RCVref}$ is reduced by increasing the output power of the storage battery 15.

As described above, the received power $P_{RCV}$ of the microgrid S1 can follow the received power target value $P_{RCVref}$ calculated using the objective function F by adjusting the output of the storage battery 15 according to the difference between the measurement value of the received power $P_{RCV}$ and the target value.

5. Calculation Load Reduction Method

In order to determine the optimum value of the received power target value $P_{RCVref}$, the SOC and the like of the storage battery 15 are required to be estimated by the number of candidates of the received power target value $P_{RCVref}$ for each time section t of the prediction target period T, and each term of the objective function F is required to be calculated. For example, in the case where the prediction target period T is one day and the number of time sections is twenty-four, when the received power target value $P_{RCVref}$ is changed in the range of 0 to 10 [kW] in increments of 1 [kW], the total number of candidates of the received power target value $P_{RCVref}$ is $11^{24}=9.85\times10^{24}$, and the calculation load increases in proportion to the total number of candidates.

The calculation load of the optimization calculation can be reduced using the following two methods.

(A) Constraint on change width of received power target value (B) Division of prediction target period T The method (A) will be described.

Because there is a possibility that the change in the received power $P_{RCV}$ affects the power quality of the power system 1, desirably the change width is as small as possible. For this reason, as illustrated in an equation 23, the constraint is provided on the change width of the received power target value $P_{RCVref}$ per time section t.

$$\Delta P_{RCVref} \le (P_{RCVref\,t} - P_{RCVref\,t-1}) \le \Delta P_{RCVref}(t \in T)$$ [Mathematical formula 23]

<Q $P_{RCVref}$: Change width maximum value of received power target value [kW]

Figure 8A:
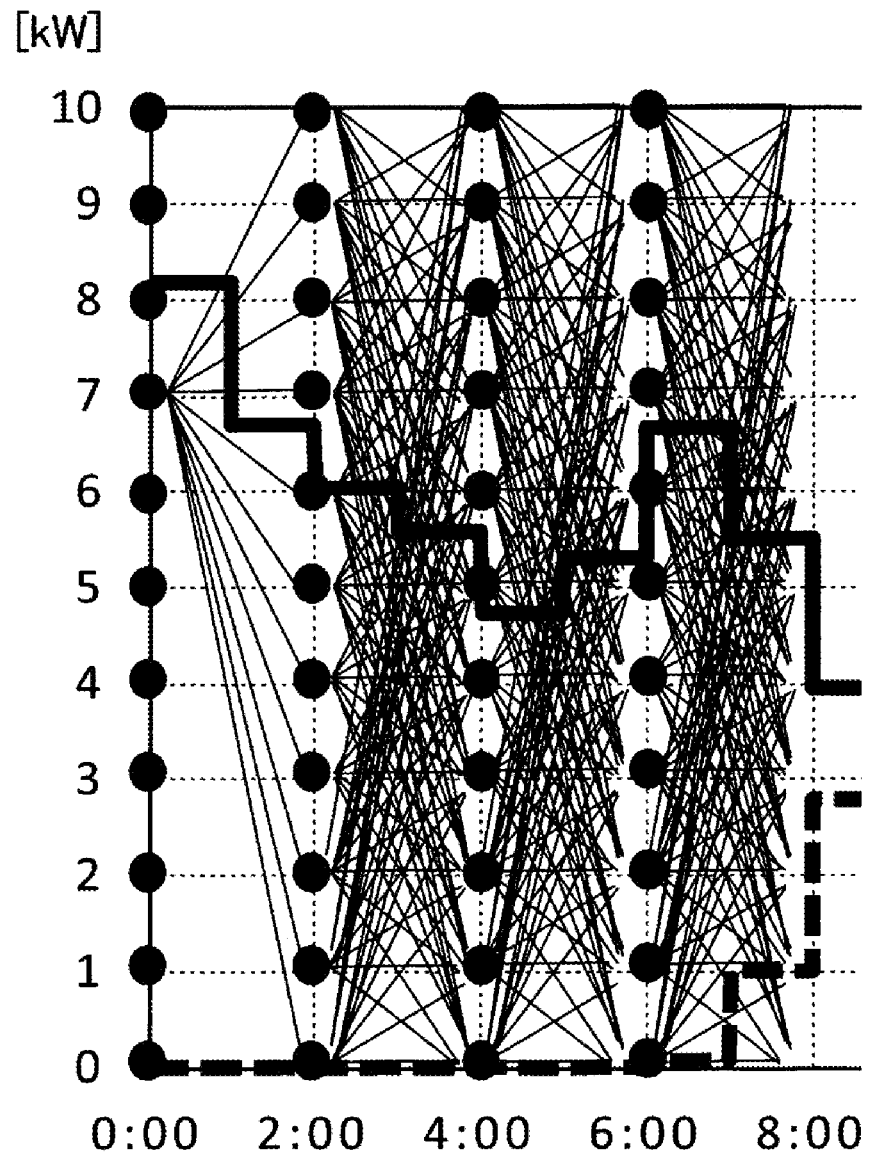
FIG. 8A is a view illustrating the number of candidates of received power.
Figure 8B:
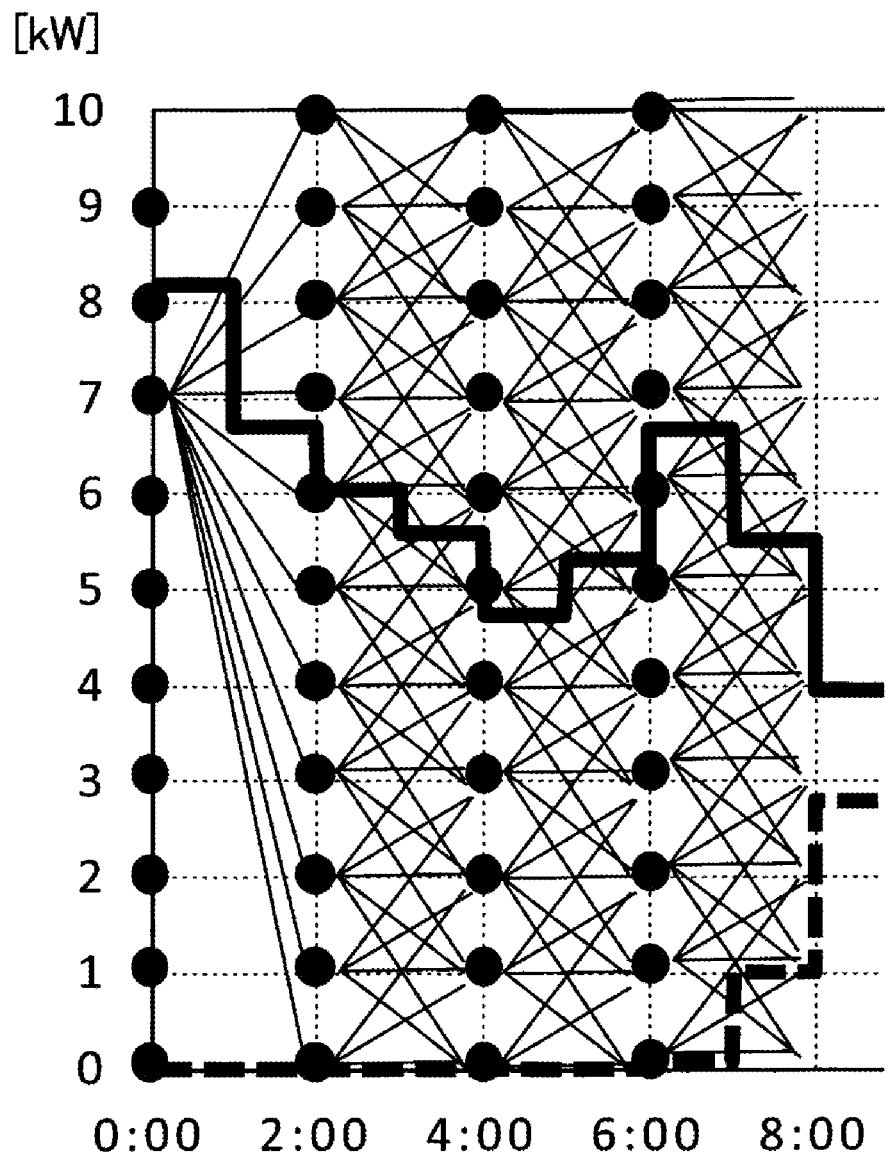
FIG. 8B is a view illustrating the number of candidates of the received power.

FIGS. 8A and 8B are views illustrating a combination of candidates of the received power target value $P_{RCVref\,t}$. FIG. 8A illustrates the case where the constraint is not provided on the change width of the received power target value $P_{RCVref}$, and FIG. 8B illustrates the case where the maximum value of the change width of the received power target value $P_{RCVref}$ is set to ±2 [kW].

The number of candidates of the received power target value $P_{RCVref}$ per time section t is "11" when the constraint is not provided on the change width of the received power target value $P_{RCVref}$ (in the case of FIG. 8A). On the other hand, the number of candidates of the received power target value $P_{RCVref}$ per time section t is "5" when the maximum value of the change width of the received power target value $P_{RCVref}$ is set to ±2 [kW] (in the case of FIG. 8B).

In this way, the constraint is provided on the change width of the received power target value $P_{RCVref}$, so that the number of candidates of the received power target value $P_{RCVref}$ per time section t can be reduced to greatly reduce the calculation load. The influence on the power system 1 can be reduced, and the quality of electricity can be maintained.

The method (B) will be described.

B1. Division of Sections

The prediction target period T is divided into a plurality of sections ΔT. The control device 50 performs the optimization calculation optimizing the energy efficiency of the microgrid S1 using each of the divided sections ΔT as one prediction target period. That is, the optimum value of the received power target value $P_{RCVref}$ of each time cross section t is determined using the objective function F.

Figure 9:
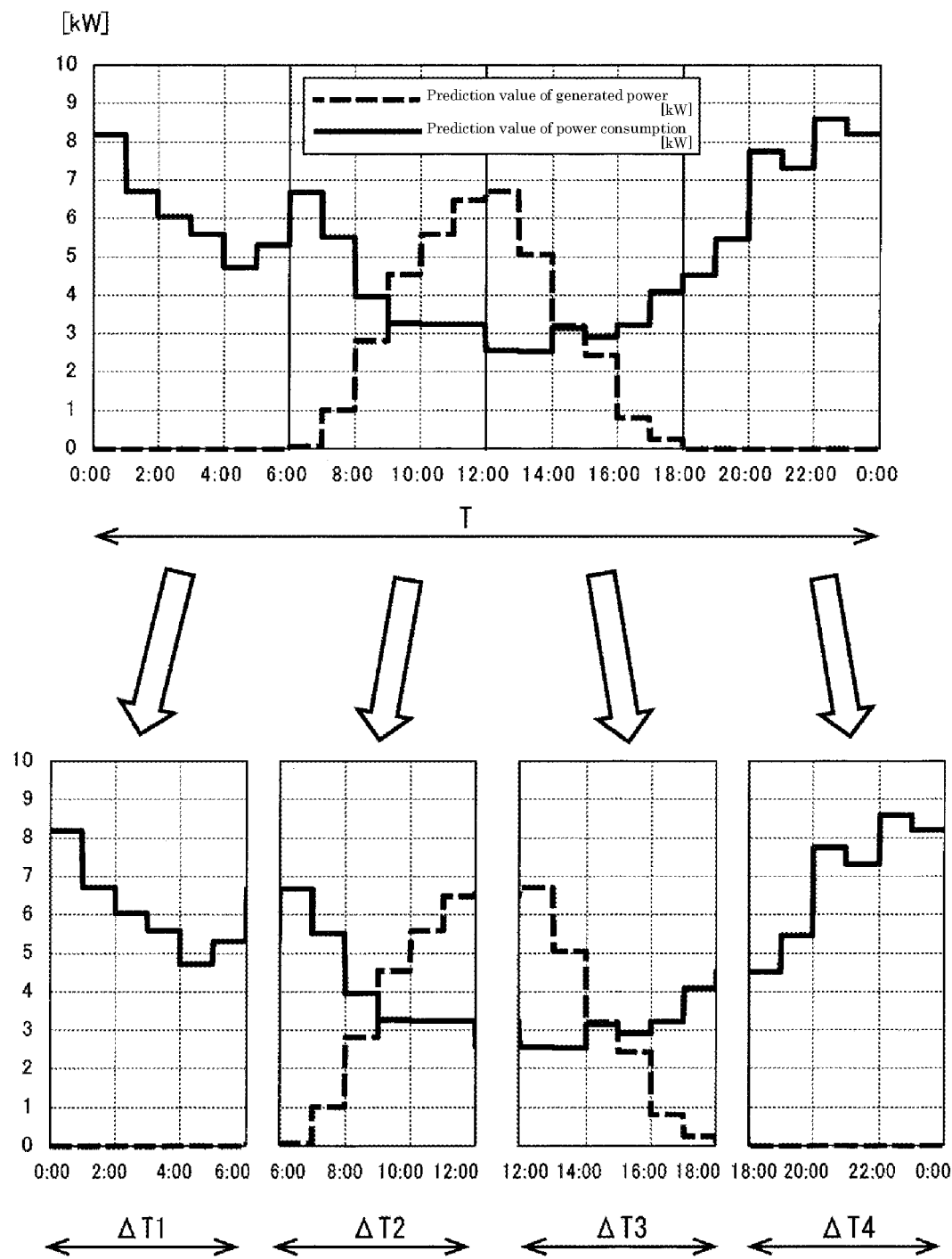
FIG. 9 is a view illustrating an example of division of a prediction target period.

For example, when the prediction target period T is one day, the prediction target period T is divided into four sections $\Delta T_1$ to $\Delta T_4$ as illustrated in FIG. 9. Then, the control device 50 obtains the optimization value of the received power target value $P_{RCVref}$ using the objective function F with each section ΔT as one prediction target period.

In this case, the received power target value $P_{RCVref}$ in the entire prediction target period T is obtained by connecting the received power target values $P_{RCVref}$ of the respective time sections t of the respective sections ΔT determined as the optimum values in time series.

When the prediction target section T is divided, the received power target value $P_{RCVref}$ of the entire prediction target period T is calculated in a plurality of times. Thus, the number of combinations of candidates of the received power target value $P_{RCVref}$ per one time is reduced, so that the calculation load can be greatly reduced.

The number of divisions N of the prediction target period T may be other than four, such as three divisions. The number of time sections of each section ΔT may or may not be the same. Each section ΔT is preferably longer than the cycles of the power generation prediction and the load prediction. In the example of FIG. 9, ΔT=6 hours and the cycle of the power generation prediction and the load prediction=1 hour.

B2. Reserve Power of Storage Battery at Start of Next Section

Figure 10:
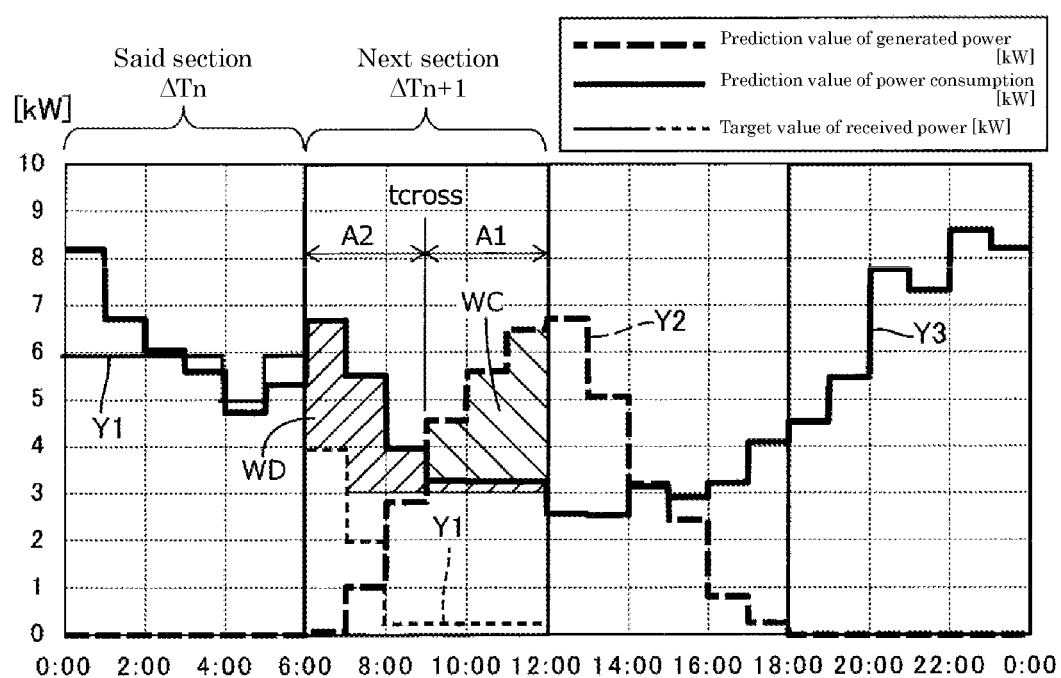
FIG. 10 is a graph illustrating a supply and demand amount of power in each section.

FIG. 10 is a graph illustrating the supply and demand prediction of the power for the prediction target section T. The supply and demand of the power can be predicted from the prediction value of the generated power of the solar power generation panel 10, the prediction value of the power consumption of the load L, and the received power target value from the power system 1. In FIG. 10, Y1 represents a received power target value (minimum), Y2 represents a generated power prediction value, and Y3 represents a prediction value of the power consumption.

In the case where the prediction target section T is divided to perform the optimization calculation for each section ΔT, when the calculation is performed in consideration only of the supply and demand prediction in the section $\Delta T_n$, sometimes the reserve power that should absorb the excess or deficiency of the power in the next section $\Delta T_{n+1}$ cannot be secured in the storage battery 15 at the start of the next section $\Delta T_{n+1}$. For this reason, there is a problem in how to secure the reserve power of the storage battery 15 in anticipation of the supply and demand prediction of the power in the next section $\Delta T_{n+1}$ at the final time point of the section $\Delta T_n$. The reserve power is an empty capacity that can be charged when a surplus of power is charged and stored. When a shortage of power is compensated for by the discharge, the capacity is a capacity that can be discharged.

In order to solve the above problem, the control device 50 of the power conditioner 20 calculates the range of the final SOC of the storage battery 15 in the section $\Delta T_n$ based on the supply and demand prediction of the power in next section $\Delta T_{n+1}$.

Figure 11:
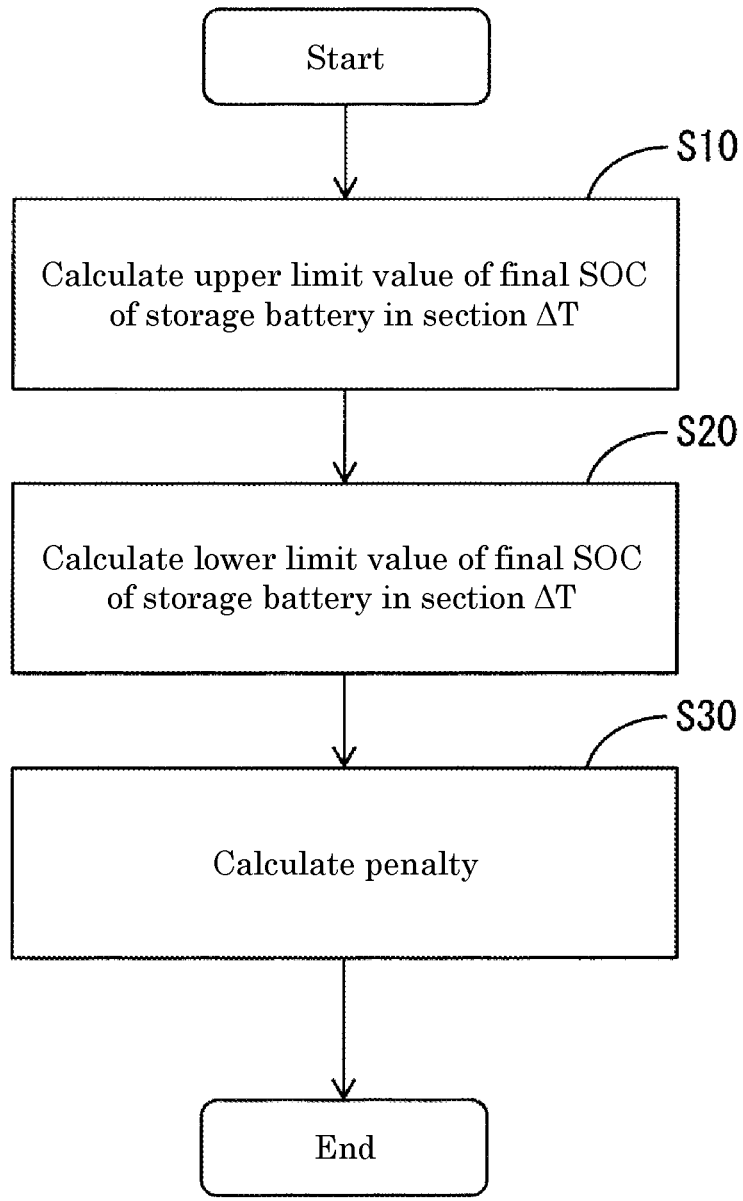
FIG. 11 is a flowchart of calculation processing.

Because the final SOC of the section $\Delta T_n$=the start SOC of the next section $\Delta T_{n+1}$, the reserve power of the storage battery 15 can be secured at the starting time point of the section $\Delta T_{n+1}$ by matching the final SOC of the storage battery 15 of the section $\Delta T_n$ with the calculated range. That is, the storage battery 15 can be operated with a margin with respect to the use range upper limit SOCMAX and the use range lower limit SOCMIN, and the excess or deficiency of the power can be compensated for by being absorbed by the charge-discharge. FIG. 11 is a flowchart of the calculation processing for calculating the SOC range.

(S10) Calculation of Upper Limit Value $SOC_{UPPER}$ of final SOC

The control device 50 calculates the upper limit value $SOC_{UPPER}$ of the final SOC of the storage battery 15 in the section $\Delta T_n$ from the surplus power amount WC in the next section $\Delta T_{n+1}$.

The surplus power amount WC is a value obtained by integrating the surplus power in the first period (A1 in FIG. 10) in which the difference between the generated power prediction value $P_{PVt}$ of the solar power generation panel 10 that is the distributed power supply and the power consumption prediction value $P_{LOADt}$ of the load L becomes continuously positive in the next section $\Delta T_{n+1}$.

The surplus power is a value obtained by adding the difference between the power consumption $P_{LOAD}$ and the received power $P_{RCV}$ to the generated power $P_{PV}$. The surplus power depends on the magnitude of the received power $P_{RCV}$ supplied from the power system 1, and is smaller as the received power $P_{RCV}$ is smaller.

When the storage battery 15 does not have the reserve power capable of charging at least the minimum surplus power amount WC, the energy loss is caused. For this reason, in this example, the minimum surplus power amount WC in the next section $\Delta T_{n+1}$ is calculated based on the generated power prediction value $P_{PVt}$, the power consumption prediction value $P_{LOADt}$, and the minimum received power target value $P_{RCVrefmin\ t}$.

A minimum received power target value $P_{RCVrefmin\ t}$ in the next section $\Delta T_{n+1}$ can be obtained by subtracting the maximum value of the change width set in (A) for each time section from a final received power prediction value $P_{RCV}$ tend in the section $\Delta T_n$.

The surplus power amount WC may be calculated over a plurality of sections such as $\Delta T_{n+1}$ and $\Delta T_{n+2}$ (as an example, there may be 6 hours to 8 hours).

The upper limit value $SOC_{UPPER}$ of the final SOC of the storage battery 15 in the section $\Delta T_n$ is obtained by subtracting the SOC corresponding to the surplus power amount WC from the use range upper limit SOCMAX of the storage battery 15 such that the free capacity that can charge the surplus power amount WC in the first period A1 can be secured. The surplus power amount WC may be a minimum value or other values.

Figure 12:
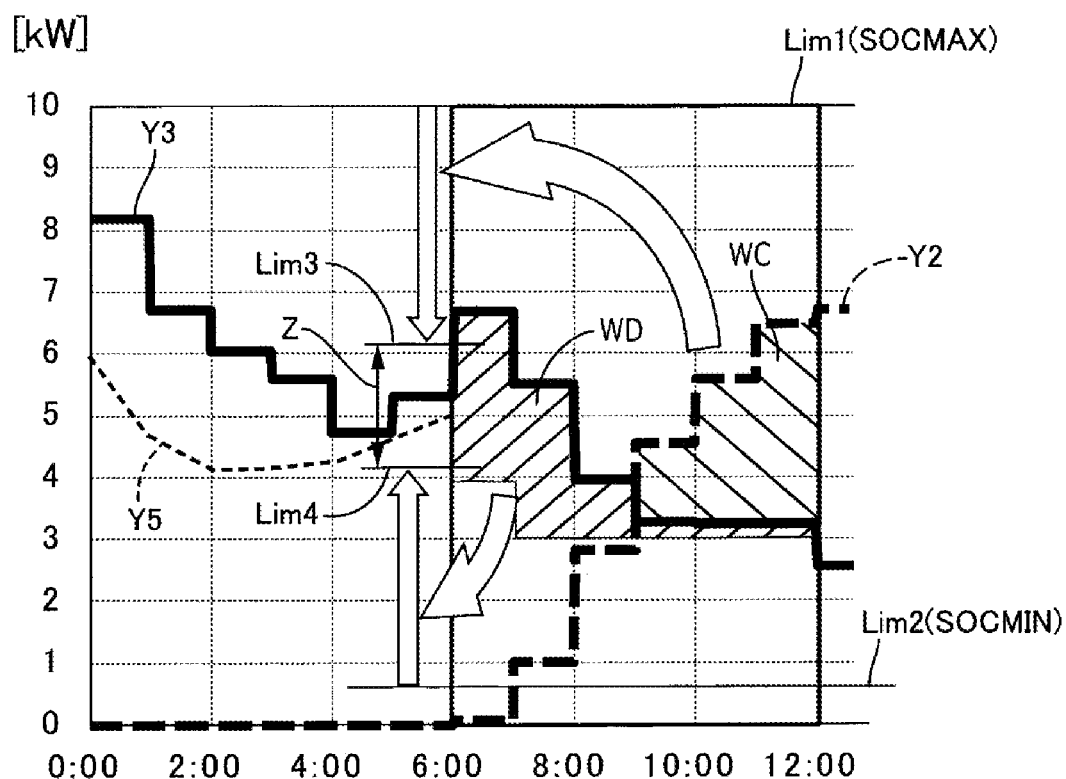
FIG. 12 is an enlarged view of a part of FIG. 10.

In FIG. 12, "Lim 1" indicates the use range upper limit SOCMAX, and "Lim 3" indicates the upper limit $SOC_{UPPER}$ of the final SOC. "Y5" is the SOC of the storage battery 15. The use range upper limit SOCMAX is a limit value (a value that cannot be charged any more) on the charge side of the SOC.

In the case of $P_{PVt} - P_{LAODt} \geq 0$      [Mathematical formula 24]

$$SOC_{UPPER} = SOCMAX - \frac{\sum_{t \in \Delta T_{n+1}} \{P_{PVt} - (P_{PVt} - (P_{LAODt} - P_{RCVrefmint})) \cdot \eta\}}{BATCAP}$$

Here, $SOC_{UPPER}$:$P_{RCVrefmint}$:

upper limit value of final soc of storage battery in divided section $\Delta T_n$ [%] minimum received power target value of time section $t$ inin divided section $\Delta T_{n+1}$ [kW]

The microgrid S1 is not only in the case where the power is excessive but also in the case where the power is insufficient due to a supply and demand balance of the power. When the final SOC of the storage battery 15 is in the vicinity of the use range lower limit SOCMIN, sometimes there is the case where it is difficult to cope with the discharge from the section start to the time section $t_{cross}$ at which the power supply becomes excessive in the next section. Therefore, the control device 50 calculates a lower limit value $SOC_{LOWER}$ of the final SOC so as to leave the remaining power that can be discharged.

(S20) Calculation of Lower Limit Value $SOC_{LOWER}$ of Final SOC

The lower limit value $SOC_{LOWER}$ of the final SOC of the storage battery 15 in the section $\Delta T_n$ is obtained by calculating the deficient power amount WD for the second period A2 from the start of the next section $\Delta T_{n+1}$ to the start of the first period A1 (to the time section $t_{cross}$ in which the supply is excessive). The deficient power amount WD is a value obtained by integrating the deficient power in the second period A2.

The deficient power is a value obtained by subtracting the generated power $P_{PV}$ and the received power $P_{RCV}$ from the power consumption $P_{LOAD}$. The deficient power depends on the magnitude of the received power $P_{RCV}$ supplied from the power system, and becomes larger as the received power $P_{RCV}$ becomes smaller.

When the storage battery 15 has the reserve power with which the maximum deficient power amount WD can be discharged, the minimum received power can be maintained, and the energy use efficiency is high. Consequently, in this example, the maximum deficient power amount WD is calculated for the second period A2 of the next section $\Delta T_{n+1}$ based on the generated power prediction value $P_{PVt}$, the power consumption prediction value $P_{LOADt}$ of the load L, and the minimum received power target value $P_{RCVrefmint}$.

The reverse power flow is generated when the discharge amount of the storage battery 15 exceeds the deficient power amount WD, so that it is not allowable to exceed the deficient power amount WD because the reverse power flow from the storage battery 15 to the system is generated.

A value obtained by adding the SOC corresponding to the deficient power amount WD to the use range lower limit SOCMIN of the storage battery 15 so as to secure the capacity capable of discharging the deficient power amount WD is the lower limit value $SOC_{LOWER}$ of the final SOC of the section $\Delta T_n$. The deficient power amount WD may be a maximum value or other values. In FIG. 12, "Lim 2" indicates the use range lower limit SOCMIN, and "Lim 4" indicates the lower limit value $SOC_{LOWER}$ of the final SOC. Y5 is the SOC of the storage battery 15. The use range lower limit SOCMIN is a limit value (a value that cannot be discharged any more) on the discharge side of the SOC.

In the case of $P_{LAODt} - P_{PVt} \geq 0$      [Mathematical formula 25]

$$SOC_{LOWER} = SOCMIN + \frac{\sum_{k=0}^{t=t_{cross}} (P_{LAODt} - P_{PVt} \cdot \eta - P_{RCVrefmint})}{BATCAP \cdot \eta} (t \in \Delta T_{n+1})$$

Here, $t_{cross}$:excessive supply reaching time section of dividing section $SOC_{LOWER}$:lower limit value of final soc of storage battery of divided section $\Delta T_n$ [%]

(S30) Penalty During Deviation

As described above, a range Z (see FIG. 12) having the lower limit of $SOC_{LOWER}$ and the upper limit of $SOC_{UPPER}$ can be obtained for the final SOC of the storage battery 15 in the section $\Delta T_n$.

When the final SOC of the storage battery 15 deviates from the range Z, namely, when the final SOC is not matched with the range Z, the final SOC is calculated as a penalty. When the final SOC does not deviates from the range Z, namely, when the final SOC is matched with the range Z, there is no penalty.

[Mathematical formula 26]

A) $SOC_{t_{end}} - SOC_{UPPER} \geq 0$ $$PENALTY_{OVER_n} = SOC_{t_{end}} - SOC_{UPPER} \quad (26A)$$

B) $SOC_{LOWER} - SOC_{t_{end}} \geq 0$ $$PENALTY_{SHORT_n} = SOC_{LOWER} - SOC_{t_{end}} \quad (26B)$$

C) $SOC_{LOWER} < SOC_{t_{end}} < SOC_{UPPER}$ $$PENALTY_{OVER_n} = PENALTY_{SHORT_n} = 0 \quad (26C)$$

Here, $SOC_{tend}$: final soc of storage battery of divided section $\Delta T_n$ [%]
$PENALTY_{OVER_n}$: upper limit value deviation penalty OD final SOC of storage battery of divided section $\Delta T_n$
$PENALTY_{SHORT_n}$: lower limit value deviation penalty OD final SOC of storage battery of divided section $\Delta T_n$ The equation 27 is an objective function E obtained by adding an evaluation term of the penalty to four items with respect to the objective function F. The optimization value of the received power target value $P_{RCVref}$ is calculated using the objective function E with the section $\Delta T$ as one prediction target period.

When the optimization calculation is performed for each section $\Delta T_n$, the final SOC of the storage battery 15 in the section $\Delta T_n$ is set to the initial $SOC_{INI}$ of the storage battery 15 in the next division section $\Delta T_{n+1}$, and the steps of S10 to S30 are repeatedly performed by the number of sections. Then, at the completion of the entire section, it is possible to obtain an optimal solution of the received power target value $P_{RCVref}$ that optimizes the energy use efficiency of the microgrid S1 for the prediction target period T.

A solution having no penalty or a small penalty is obtained as the optimal solution by adding the penalty evaluation term to the objective function E, so that it is possible to prevent that the final SOC of the section $\Delta T_n$ is not matched with the range Z.

[Objective function]        [Mathematical formula 27]

$E =$ $\sum_{n \in N} \sum_{t \in \Delta T_n} \{k_1 \cdot T_{MAX}(P_{RCVref_{t_n}}, P_{PV_{t_n}}, P_{LOAD_{t_n}}) +$ $k_2 \cdot T_{MIN}(P_{RCVref_{t_n}}, P_{PV_{t_n}}, P_{LOAD_{t_n}}) +$ $k_3 \cdot P_{RCV}(P_{RCVref_{t_n}}, P_{PV_{t_n}}, P_{LOAD_{t_n}}) +$ $(k_5 \cdot PENALTY_{OVER_n} +$ $k_6 \cdot PENALTY_{SHORT_n})\} + k_4 \cdot P_{PEAK}$ Here, $k_5, k_6$: weight coefficient The magnitude relationship between the coefficients $k_5$, $k_6$ that determine a weight of the penalty and other coefficients may be $k_1 > k_2 > k_3 > k_4 > k_5 > k_6$. $k_5 > k_6 > k_1 > k_2 > k_3 > k_4$ may be satisfied. The magnitude relationship between the two coefficients may be $k_5 > k_6$ or $k_5 < k_6$.

6. Effects

The storage battery 15 can charge the surplus power of the microgrid S1 and can discharge the surplus power during the shortage of the power to compensate it. When the use of the storage battery 15 is restricted, the surplus power cannot be stored and the energy is lost, so that the energy use efficiency of the microgrid S1 decreases.

In this configuration, the use-restricted period of the storage battery 15 can be minimized by obtaining the optimum value of the received power target value $P_{RCVreft}$ based on the objective function E or the objective function F. Thus, the energy use efficiency of the microgrid S1 can be optimized from the viewpoint of the use efficiency of the storage battery 15.

In this configuration, the prediction target period T is divided into a plurality of sections $\Delta T$ to perform the optimization calculation optimizing the energy use efficiency of the microgrid S1. Consequently, the calculation load can be reduced, and the time for calculating the optimal solution can be shortened.

In this configuration, the range Z of the final SOC in the section $\Delta T_n$ is determined based on the supply and demand prediction of the power in and after the next section $\Delta T_{n+1}$. Because the final SOC of the section $\Delta T$ is the start SOC of the next section $\Delta T_{n+1}$, the storage battery 15 can secure the reserve power that should absorb the excess or deficiency of the power in and after the next section $\Delta T_{n+1}$ at the start of the next section $\Delta T_{n+1}$ by matching the final SOC of the section $\Delta T_n$ with the range Z.

In this configuration, the surplus power amount WC in the first period A1 in which the supply of power exceeds the demand is calculated based on the supply and demand prediction of the power in and after the next section $\Delta T_{n+1}$. The upper limit value $SOC_{UPPER}$ of the final SOC in the section $\Delta T_n$ of the storage battery 15 is determined to be a value obtained by subtracting the SOC corresponding to the surplus power amount WC from the use range upper limit SOCMAX. In this configuration, at the starting time point of the next section $\Delta T_{n+1}$, the reserve power charging the surplus power of the microgrid S1 can be secured in the storage battery 15. Thus, energy loss can be prevented.

In this configuration, the deficient power amount WD is calculated for the second period A2 from the start of the next section $\Delta T_{n+1}$ to the first period A1. The lower limit value $SOC_{LOWER}$ of the final SOC in the section $\Delta T_n$ of the storage battery 15 is determined to be a value obtained by adding the SOC corresponding to the deficient power amount WD to the use range lower limit SOCMIN. In this configuration, at the starting time point of the next section $\Delta T_{n+1}$, the reserve power discharging the deficient power of the microgrid S1 can be secured in the storage battery 15. Therefore, the energy can be efficiently used.

Other Embodiments

The present invention is not limited to the embodiments described with reference to the above description and the drawings. For example, the following embodiments are also included in the technical scope of the present invention.

Figure 13:
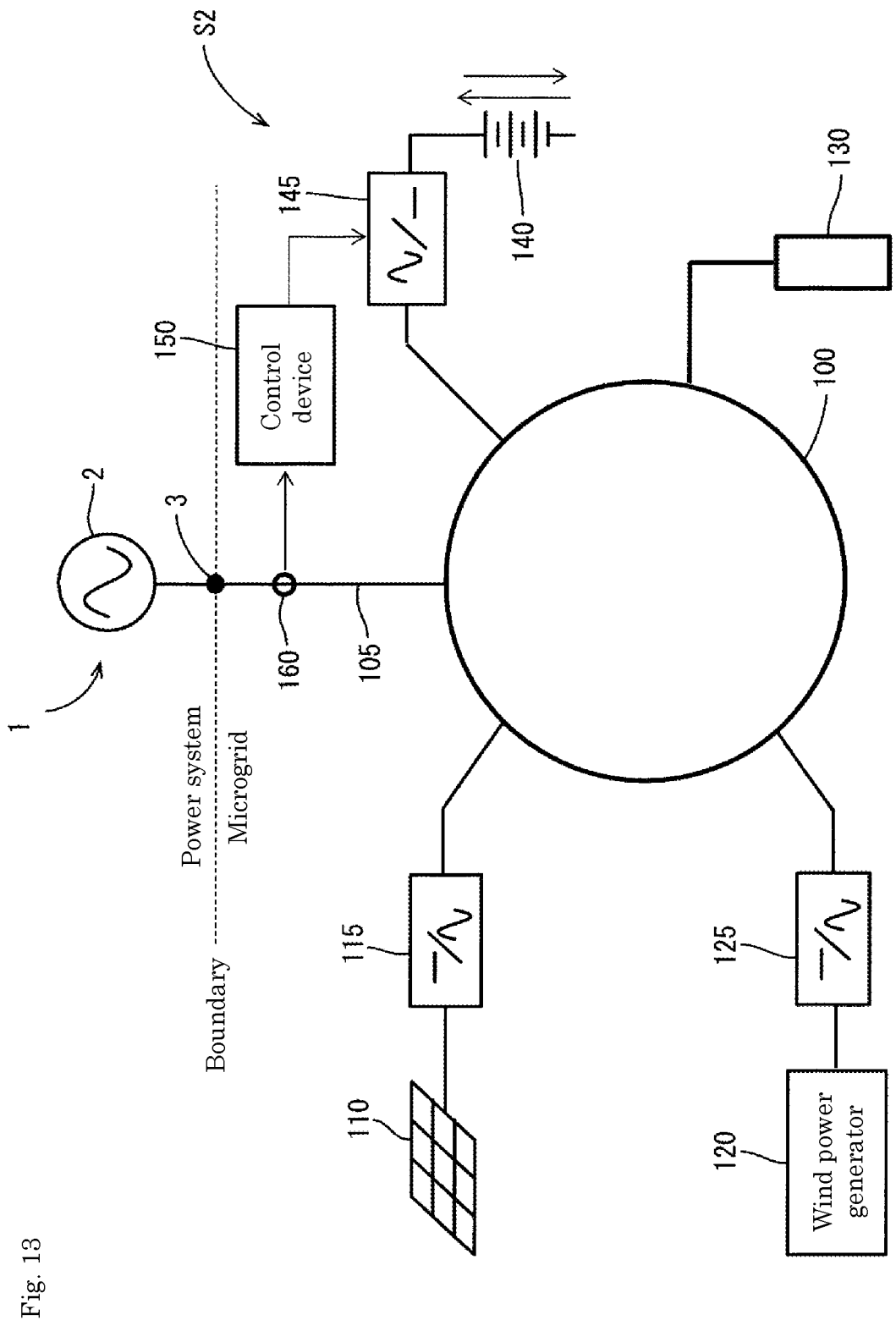
FIG. 13 is a block diagram of the microgrid.

(1) In the first embodiment, the grid having the linear power line (trunk line) 5 is illustrated as an example of the microgrid S1. Alternatively, a grid having a circular power line (trunk line) may be used. A microgrid S2 in FIG. 13 includes a power line 100 having a circular shape. A solar power generation panel 110 and a wind power generator 120 are connected to the power line 100 through power converters 115, 125. A load 130 and a storage battery 140 are connected to the power line 100. The power line 100 of the microgrid S2 is connected to the power system 1 through the interconnection line 105.

The microgrid S2 includes a control device 150. The control device 150 divides the prediction target period T into the plurality of sections to perform the optimization calculation optimizing the energy use efficiency of the microgrid S2, thereby calculating the optimal solution of the received power target value $P_{RCVref}$. The control device 150 performs power control of the microgrid S2 such that the received power of the power receiving point 3 follows the calculated received power target value $P_{RCVref}$. Specifically, the received power $P_{RCV}$ of the power receiving point 3 is monitored based on the output of the meter 160 provided at the power receiving point 3. When the difference exists with respect to the received power target value $P_{RCVref}$, the control device 150 charges or discharges the storage battery 140 through the power converter 145 to reduce the difference. In this way, the received power $P_{RCV}$ can follow the calculated target value $P_{RCVref}$, and the energy use efficiency of the microgrid S2 can be optimized. The control device 150 is an example of the "calculation apparatus" of the present invention.

The distributed power supply is a generic term for all small-scale power generation facilities dispersedly disposed adjacent to a demand site. For example, the distributed power supply may be a biomass power generator or the like in addition to the solar power generation panel 10 and the wind power generator 120. The distributed power supply may be a power source using renewable energy or a power source using fossil fuel.

(2) In the first embodiment, the calculation optimizing the energy use efficiency of the microgrid S1 is performed using the received power target value as the variable. The calculation optimizing the energy use efficiency of the microgrid may be performed using the SOC of the storage battery 15 as the variable. The present technique can be applied not only to the microgrid (small-scale power system) but also to the grid (power system) that is interconnected to another power system and includes the energy storage apparatus. In the first embodiment, the storage battery 15 is exemplified as the energy storage apparatus. Alternatively, the energy storage apparatus may be a capacitor or the like.

(3) In the first embodiment, the objective function F includes four terms of the first term to the fourth term, and the four terms are multiplied by the weighting coefficients $k_1$ to $k_4$ and added. In the first embodiment, the magnitude relationship of the weighting factors is $k_1 > k_2 > k_3 > k_4$. Alternatively, the magnitude relationship may be $k_3 > k_4 > k_1 > k_2$. The electricity rate of the microgrid can be preferentially evaluated by reversing the magnitude relationship of the weighting factors, so that the energy use efficiency of the microgrid can be optimized from the viewpoint of the electricity rate. The objective function F may be only the first and second terms evaluating the use-restricted period of the storage battery 15, or may be only the third and fourth terms evaluating the electricity rate of the microgrid. The objective function F may be any other function as long as the function optimizes the energy utilization efficiency of the microgrid. The same applies to the objective function E.

(4) In the first embodiment, the optimization calculation optimizing the energy use efficiency of the microgrid is performed by the control device 50 of the power conditioner 20. A communication subject is not limited to the power conditioner 20, but may be an arithmetic device provided separately from the power conditioner 20.

(5) In the first embodiment, the calculation optimizing the energy use efficiency of the microgrid has been described using the objective functions E, F. Alternatively, the calculation may be performed using, for example, AI.

(6) In the first embodiment, the upper limit value $SOC_{UPPER}$ and the lower limit value $SOC_{LOWER}$ of the final SOC in the section $\Delta T_n$ are obtained. For example, in the next section $\Delta T_{n+1}$, when the second period A2 in which the power is insufficient does not exist before the first period A1, the upper limit value $SOC_{UPPER}$ of the final SOC may be obtained based on the surplus power amount WC in the first period A1, and the lower limit value of the final SOC may be the use range lower limit SOCMIN. On the contrary, in the next section $\Delta T_{n+1}$, when only the period in which the power is insufficient exists, the lower limit value $SOC_{LOWER}$ of the final SOC may be obtained based on the deficient power amount WD, and the upper limit value of the final SOC may be the use range upper limit SOCMAX.

(7) In the first embodiment, the SOC [%] of the storage battery 15 was evaluated in the calculation optimizing the energy use efficiency of the microgrid. The residual capacity [Ah] of the storage battery 15 may be evaluated instead of the SOC [%]. That is, the range of the final residual capacity in the prediction target section $\Delta T_n$ of the storage battery 15 may be determined based on the supply and demand prediction of the power after the next section, and whether the final residual capacity in the section $\Delta T_n$ is matched with the determined range may be evaluated in the optimization calculation of the prediction target section $\Delta T_n$. The SOC and the residual capacity are examples of the "state of charge" of the storage battery.

(8) In the first embodiment, the prediction target period T is divided into a plurality of sections in order to reduce the load of optimization calculation. The present technique is not limited to dividing or not dividing the prediction target period, but can be applied to the case where the optimization calculation is performed for an arbitrary prediction target section.

The invention claimed is:

1. A calculation apparatus for optimizing energy use efficiency of a grid that is interconnected to a power system and includes an energy storage apparatus, wherein a range of a final charge state in a prediction target section of the energy storage apparatus is determined based on a supply and demand prediction of power in a next section or later, and whether the final charge state of the section is matched with the range is evaluated by the optimization calculation of the prediction target section, wherein a surplus power amount in a first period, in which supply of the power exceeds demand in the next section or later, is calculated based on the supply and demand prediction of the power in the next section or later, and wherein the calculation apparatus generates and initiates a command that automatically causes a bidirectional inverter circuit to perform switching between a forward conversion operation and a reverse conversion operation within the first period and based upon the surplus power amount exceeding the demand in the next section or later.

2. The calculation apparatus according to claim 1, wherein:
an upper limit value of the final charge state in the section is determined to be a value obtained by subtracting a numerical value corresponding to the surplus power amount from a use range upper limit of the energy storage apparatus.

3. The calculation apparatus according to claim 2, wherein:

a minimum surplus power amount in the first period is calculated based on the supply and demand prediction of the power in the next section or later, and the upper limit value of the final charge state in the section is determined to be a value obtained by subtracting a numerical value corresponding to the minimum surplus power amount from the use range upper limit of the energy storage apparatus.

4. The calculation apparatus according to claim 2, wherein:

a deficient power amount, by which power supply falls below the demand to cause power shortage, is calculated for a second period from a start of the next section to the first period, and a lower limit value of the final charge state in the section is determined to be a value obtained by adding a numerical value corresponding to the deficient power amount to a use range lower limit of the energy storage apparatus.

5. The calculation apparatus according to claim 4, wherein:

a maximum deficient power amount in the second period is calculated based on the supply and demand prediction of the power in the next section or later, and the lower limit value of the final charge state in the section is determined to be a value obtained by adding a numerical value corresponding to the maximum deficient power amount to the use range lower limit of the energy storage apparatus.

6. A calculation method for optimizing energy use efficiency of a grid that is interconnected to a power system and includes an energy storage apparatus, the calculation method comprising:

determining a range of a final charge state in a prediction target section of the energy storage apparatus based on a supply and demand prediction of power in a next section or later;

evaluating whether the final charge state of the section is matched with the range by optimization calculation of the prediction target section, calculating a surplus power amount, in a first period, in which supply of the power exceeds demand in the next section or later, based on the supply and demand prediction of the power in the next section or later, and generating and initiating a command that automatically causes a bidirectional inverter circuit to perform switching between a forward conversion operation and a reverse conversion operation within the first period and based upon the surplus power amount exceeding the demand in the next section or later.

7. The calculation apparatus according to claim 3, wherein:

a deficient power amount, by which power supply falls below the demand to cause power shortage, is calculated for a second period from a start of the next section to the first period, and a lower limit value of the final charge state in the section is determined to be a value obtained by adding a numerical value corresponding to the deficient power amount to a use range lower limit of the energy storage apparatus.

8. The calculation apparatus according to claim 7, wherein a maximum deficient power amount in the second period is calculated based on the supply and demand prediction of the power in the next section or later, and the lower limit value of the final charge state in the section is determined to be a value obtained by adding a numerical value corresponding to the maximum deficient power amount to the use range lower limit of the energy storage apparatus.

9. The calculation apparatus according to claim 3, wherein the minimum surplus power amount is calculated based on a combination of: a predicted generated power value, a predicted power consumption value, and a minimum received power target value.

10. The calculation apparatus according to claim 4, wherein the deficient power amount is obtained by subtracting a generated power value and a received power value from a power consumption value.

11. The calculation apparatus according to claim 7, wherein the deficient power amount is obtained by subtracting a generated power value and a received power value from a power consumption value.

12. The calculation method according to claim 6, wherein an upper limit value of the final charge state in the section is determined to be a value obtained by subtracting a numerical value corresponding to the surplus power amount from a use range upper limit of the energy storage apparatus.

13. The calculation method according to claim 12, wherein:

a minimum surplus power amount in the first period is calculated based on the supply and demand prediction of the power in the next section or later, and the upper limit value of the final charge state in the section is determined to be a value obtained by subtracting a numerical value corresponding to the minimum surplus power amount from the use range upper limit of the energy storage apparatus.

14. The calculation method according to claim 12, wherein:

a deficient power amount, by which power supply falls below the demand to cause power shortage, is calculated for a second period from a start of the next section to the first period, and a lower limit value of the final charge state in the section is determined to be a value obtained by adding a numerical value corresponding to the deficient power amount to a use range lower limit of the energy storage apparatus.

15. The calculation method according to claim 14, wherein:

a maximum deficient power amount in the second period is calculated based on the supply and demand prediction of the power in the next section or later, and the lower limit value of the final charge state in the section is determined to be a value obtained by adding a numerical value corresponding to the maximum deficient power amount to the use range lower limit of the energy storage apparatus.

16. The calculation method according to claim 13, wherein:

a deficient power amount, by which power supply falls below the demand to cause power shortage, is calculated for a second period from a start of the next section to the first period, and a lower limit value of the final charge state in the section is determined to be a value obtained by adding a numerical value corresponding to the deficient power amount to a use range lower limit of the energy storage apparatus.

17. The calculation method according to claim 16, wherein a maximum deficient power amount in the second period is calculated based on the supply and demand prediction of the power in the next section or later, and the lower limit value of the final charge state in the section is determined to be a value obtained by adding a numerical value corresponding to the maximum deficient power amount to the use range lower limit of the energy storage apparatus.

18. The calculation method according to claim 16, wherein the deficient power amount is obtained by subtracting a generated power value and a received power value from a power consumption value.

19. The calculation method according to claim 13, wherein the minimum surplus power amount is calculated based on a combination of: a predicted generated power value, a predicted power consumption value, and a minimum received power target value.

20. The calculation method according to claim 14, wherein the deficient power amount is obtained by subtracting a generated power value and a received power value from a power consumption value.

\* \* \* \* \*